US009351077B1

(12) United States Patent
Ford

(10) Patent No.: US 9,351,077 B1
(45) Date of Patent: May 24, 2016

(54) SYSTEMS AND METHODS FOR INDEPENDENT AND CONTROL-ISOLATED AUDIO PROCESSING (ICIAP)

(71) Applicant: L-3 Communications Integrated Systems LP, Waco, TX (US)

(72) Inventor: Walter D. Ford, Robinson, TX (US)

(73) Assignee: L-3 Communications Integrated Systems LP, Waco, TX (US)

( * ) Notice: Subject to any disclaimer, the term of this patent is extended or adjusted under 35 U.S.C. 154(b) by 26 days.

(21) Appl. No.: 14/567,391

(22) Filed: Dec. 11, 2014

(51) Int. Cl.
| H04R 5/02 | (2006.01) |
| H04R 5/04 | (2006.01) |
| H04B 1/16 | (2006.01) |
| H04R 27/00 | (2006.01) |
| H04R 3/12 | (2006.01) |

(52) U.S. Cl.
CPC ............... *H04R 5/04* (2013.01); *H04B 1/1676* (2013.01); *H04R 3/12* (2013.01); *H04R 5/02* (2013.01); *H04R 27/00* (2013.01)

(58) Field of Classification Search
None
See application file for complete search history.

(56) References Cited

U.S. PATENT DOCUMENTS

| 4,482,980 | A | 11/1984 | Korowitz et al. |
| 4,612,635 | A | 9/1986 | Leete |
| 4,628,501 | A | 12/1986 | Loscoe |
| 4,631,718 | A | 12/1986 | Miyao |
| 4,893,302 | A | 1/1990 | Hemmady et al. |
| 5,003,531 | A | 3/1991 | Farinholt et al. |
| 5,206,857 | A | 4/1993 | Farleigh |
| 5,469,283 | A | 11/1995 | Vinel et al. |
| 5,483,535 | A | 1/1996 | McMillen et al. |
| 5,517,232 | A | 5/1996 | Heidemann et al. |
| 5,550,820 | A | 8/1996 | Baran |
| 5,638,512 | A | 6/1997 | Osman et al. |
| 5,706,278 | A | 1/1998 | Robillard et al. |
| 5,745,269 | A | 4/1998 | Chawki et al. |
| 5,757,801 | A | 5/1998 | Arimilli |
| 5,864,680 | A | 1/1999 | Edblad et al. |
| 5,909,431 | A | 6/1999 | Kuthyar et al. |
| 6,226,296 | B1 | 5/2001 | Lindsey et al. |
| 6,577,414 | B1 | 6/2003 | Feldman et al. |

(Continued)

FOREIGN PATENT DOCUMENTS

| WO | WO97/41650 | 11/1997 |
| WO | WO99/63698 | 12/1999 |

OTHER PUBLICATIONS

Wikipedia, "Defense Red Switch Network", Printed from Internet Aug. 20, 2014, 2 pgs.

(Continued)

*Primary Examiner* — Muhammad N Edun
(74) *Attorney, Agent, or Firm* — Egan, Peterman, Enders & Huston LLP

(57) ABSTRACT

Systems and methods are provided that may implement independent and control-isolated audio processing (ICIAP) to separate and/or control audio streams at multiple levels of sensitivity and/or security. The disclosed systems and methods may be implemented in one example using separate real time digital audio processing and mixing hardware "channels" for each audio stream that are provided within an ICIAP connection system that includes at least one ICIAP audio processing device and a separate control processor, while at the same time incorporating a comprehensive set of interlocks to ensure the separation of audio data streams from one another and from control information, and to ensure authorization in real time for each different audio stream.

26 Claims, 11 Drawing Sheets

(56) References Cited

U.S. PATENT DOCUMENTS

| | | |
|---|---|---|
| 6,611,537 B1 | 8/2003 | Edens et al. |
| 6,834,057 B1 | 12/2004 | Rabenko et al. |
| 7,298,975 B2 | 11/2007 | Parker |
| 7,389,153 B2 * | 6/2008 | Giaimo, III .............. A63F 13/12 381/123 |
| 7,689,123 B2 | 3/2010 | Parker |
| 9,020,966 B2 * | 4/2015 | Erol .................. G06F 17/30026 707/718 |
| 2015/0288472 A1 * | 10/2015 | Ellis ........................ H04B 1/20 455/2.01 |

OTHER PUBLICATIONS

L3, Force, Digital Intercommunications Systems, Printed from Internet Aug. 20, 2014, 2 pgs.

Kilm et al., "Flexibility and Quality in the Access Network", IEEE, 1992, 5 pgs.

Singh et al., "Maximize System Performance Using Xilinx Based AX14 Interconnects", Xilinx, Jul. 22, 2013, 14 pgs.

Navy Training System Plan for the E-6A/B, Tacamo Aircraft, Nov. 2002, 133 pgs.

* cited by examiner

SYSTEMS AND METHODS FOR INDEPENDENT AND CONTROL-ISOLATED AUDIO PROCESSING (ICIAP)

FIELD OF THE INVENTION

This invention relates generally to audio processing, and more particularly to isolated audio processing.

BACKGROUND

Fiber-optic based digital intercommunication systems have been provided for handling communications on multiple-operator platforms, such as aircraft. Operators interacting with audio at various levels of security classification or importance (i.e., cross-domain interactions) require equipment that will allow them to listen to audio at a variety of security levels simultaneously and to talk on one selected security level while ensuring isolation between the audio streams and meeting Information Assurance requirements. Conventional digital intercommunication systems have been provided that attempt to handle multi-level security (MLS) audio communications to allow simultaneous connection to multiple networks at different security levels. Some systems utilize software running on a single software-programmable CPU to mix the audio and to manage the control of the system. Other audio products exist that attempt to implement multiple levels of audio processing by using a single, isolated system for each processing level (Multiple Independent Level Security, MILS). Some products also enforce separation of audio data from control data. Mixing in hardware is sometimes employed to maintain channel separation and to provide multiple levels of security. Other security-relevant systems regularly employ the use of security "tags" onto data to identify or specify the security level of specific items or piece of data as it travels through a system or device. Systems allowing transmission of data between multiple levels of security are commonly referred at Cross Domain Solutions (CDS).

Government agencies may levy requirements on CDS to ensure the separation of data at multiple levels security, for example, to provide MLS security during joint service and coalition (multi-nation) operations where various audio classification levels are used, permitting side by side personnel to have audio communications (e.g., to listen to audio at a variety of levels simultaneously and to talk on one selected level while ensuring isolation between the audio streams) at restricted levels without the worry of information being compromised.

SUMMARY

Disclosed herein are systems and methods that may be implemented to provide independent and control-isolated audio processing (ICIAP) to separate and/or control audio streams at multiple levels of security (e.g., sensitivity). The disclosed systems and methods may be implemented in one embodiment to provide ICIAP for multiple different secure audio streams in order to separate and/or control audio streams at multiple levels in a multiple operator environment, e.g., on a common platform such as aircraft, unmanned aerial vehicle (UAV), drone, ship, submarine, motor vehicle or spacecraft. Using the disclosed system and methods, multi-level security (MLS) may be provided in one embodiment within a CDS that is adaptable to virtually any platform requiring MLS, and which may be implemented to provide an authentic and dynamic CDS with real-time audio, and/or control of multiple levels of security. Thus, the disclosed systems and methods may be advantageously implemented, for example, to provide MLS security during joint service and coalition (multi-nation) operations where various audio classification levels are used, permitting side by side personnel to have audio communications (e.g., to listen to audio at a variety of levels simultaneously and to talk on one selected level while ensuring isolation between the audio streams) at restricted levels without the worry of information being compromised.

The disclosed systems and methods may also be implemented in one embodiment within an ICIAP communications network using an ICIAP communication system that includes one or more ICIAP connection systems provided on a common platform to allow multiple different operators or users on the platform to communicate simultaneously using multiple different simultaneous conferences. Such an ICIAP communications network may further support having all users on a single conference channel, or any subset thereof, and conferences may include radios and other equipment, and may be unclassified (e.g., such as Black, Clear or Unsecure) or classified (e.g., such as Red or Secure). Specified conferences can be restricted to a subset of users, if desired. In addition, an ICIAP communications network may be implemented to support signaling on a station by station basis as part of a platform network, e.g., such as local area network (LAN) or other type network. A fixed group of stations (or an individual) may be signaled, e.g., by transmitting a tone to an ear/speaker and/or flashing a light on a control panel. An ICIAP communications network may be further configured to support fixed/ringing conferences to signal a fixed group of stations designated for the conference whenever the conference is activated. A user on an ICIAP communications network may also build a conference dynamically, e.g., by signaling individual users and then adding the users into a conference, similar to building a teleconference using a standard phone system.

Further, an ICIAP communications network may be configured to allow any combination of audio channels to be monitored at any or all stations. When monitoring, each channel may have individually adjustable volume and azimuth (e.g., when using binaural headsets) settings. Certain channels (e.g., aural warnings, PA) may be configured in one exemplary embodiment to always monitor at high (+6 dB) levels. An ICIAP communications network may have built-in support for point-to-point calling in one embodiment, in which case any node on a communications backbone may signal ("Dial") and exclusively talk to another node in the system. Calling features may include, for example, call hold, call waiting, caller ID, and busy signaling capabilities. Additionally, all nodes in the system may in one embodiment have real-time access to the conference, monitor, and calling status of all other nodes on the ring. An ICIAP communications network may also be configured in one embodiment to handle many non-audio signals, including data signals, discretes and special purpose wide-band signals, e.g., by modems, multiplexers, etc. For such type of signals, an ICIAP communications network may be configured in one embodiment with the capability to digitize and route signals in a one-to-one or one-to-many mode.

In one embodiment, the disclosed systems and methods may be implemented using separate real time digital audio processing and mixing hardware "channels" for each audio stream that are provided within an ICIAP connection system that includes at least one ICIAP audio processing device and a separate but common control processor or other type of separate but common control processing device for controlling all channels, while at the same time incorporating a comprehensive set of interlocks (i.e., security checks for data insertion and data extraction) to ensure the integrity of the audio data and control, and to verify access authorization in real time to the audio data of each different audio stream. Although an exemplary embodiment utilizing a control processor is described herein, it will be understood that a control processing device may be any suitable type of processing device including any other type of processing device described herein, such as an FPGA or a stand-alone processor, a device on a separate circuit board, or any other type of processing device that is suitable for performing the tasks of a control processor or processing device described herein.

Examples of suitable types of ICIAP audio processing devices include channelized processing devices having multiple separate and isolated hardware data communication paths or channels defined through the processing device that do not share memory resources, processing resources, or other type of shared programmable logic resources between the channels for handling audio data insertion and extraction tasks described herein (e.g., such as an FPGA processing device that has been configured by VHDL or Verilog code to not share any FPGA fabric resources or memory resources between channels). Specific examples of such suitable ICIAP audio processing devices include, but are not limited to, programmable logic device (PLD) integrated circuits such as one-time configurable or reconfigurable devices. Specific examples include, but are not limited to, field-programmable gate arrays (FPGAs), application specific integrated circuits (ASICs), programmable logic array devices (PLAs), programmable array logic devices (PALs), complex programmable logic devices (CPLDs), etc. Each ICIAP processing device may be independent and isolated from other devices processing audio stream data or control information The ICIAP connection system may be coupled to a communication backbone that is configured to interconnect the ICIAP connection system with other ICIAP connection systems of an ICIAP switching system and/or with various sources of audio data and/or control messages for purposes of audio data and control signal distribution. Examples of suitable communication backbones for audio data distribution include, but are not limited to, a Time Division Multiplexing (TDM) Synchronous Optical Network (SONET) backbone ring (or any other type of TDM format) that transfers audio data so as to distribute the audio data to and from each local audio processing device of a given ICIAP connection system and to and from audio processing devices of other ICIAP connection systems of an ICIAP switching system.

For example, in one exemplary embodiment, multiple hardware audio channel processing channels (or nodes) may be implemented on a single ICIAP audio processing device using independent and dedicated hardware for each input and output channel to provide a dynamic CDS that may be employed to allow a given operator to simultaneously listen to multiple different audio streams corresponding to a variety of different classification levels and/or different designated priority levels, while at the same time allowing a given operator to talk on a single audio stream that corresponds to one selected classification level or designated priority level with ensured isolation between the different audio streams and compliance with Information Assurance requirements. In such an exemplary embodiment, isolation (e.g., no shared hardware for audio, the only multi-channel element is control, each audio sample is verified during processing) may be maintained between individual audio stream channel inputs while at the same time providing control of the mixing of audio streams to satisfy the operator/s' audio mixing requests with a very high assurance that no crosstalk or unauthorized access to any given audio stream occurs. In a further exemplary embodiment, explicit isolation may be provided and maintained between the control signals of each of the audio channel processing nodes and the audio data that is being processed by each of these nodes. Further, authorization checks may be performed during real time audio processing by each of the audio channel processing nodes of the ICIAP audio processing device that is communicatively coupled to other components of an ICIAP switching system, e.g., by a SONET ring or other suitable communication backbone architecture (e.g., such as Ethernet, VoIP, T1/E1, Serial RapidIO "SRIO", etc.).

In one exemplary embodiment, the disclosed systems and methods may be implemented as a cross-domain solution (CDS) for audio that provides Classified/Classified and/or Classified/Unclassified isolation between individual audio input audio channels and controls the mixing of audio to satisfy system operators' requests with a very high assurance that no crosstalk or unauthorized access to the audio or control data occurs. In this regard, the disclosed systems and methods may be employed to advantageously maintain Classified/Classified separation on a multiple-operator platform between multiple audio streams having the same security classification, and/or Classified/Unclassified separation on a multiple-operator platform between multiple audio streams having different security classifications. In any case, such an embodiment may be employed to allow operators interacting with audio at various levels of security classification or importance (i.e., cross-domain interactions) to listen to audio at a variety of security levels simultaneously and to talk on one selected security level while ensuring isolation between the audio streams. This is in contrast to conventional single processor systems that provide no guarantee of channel separation when processing audio and control data in shared memory, and that provide no guaranteed isolation between the audio processing and the control processing. This is also in contrast to conventional multi-processor systems that isolate control and audio at independent levels of security and cannot share audio or control data between those isolated levels. Rather, the disclosed systems and methods may be implemented to provide dynamic operation and inherent separation between each input, each output and the control data.

In one exemplary embodiment, an ICIAP audio processing device of each ICIAP communication system may include one or more hardware digital audio input channels (or nodes) and one or more hardware digital audio output channels (or nodes). Each of the digital audio input channels may be configured through one or more ICIAP control registers of the ICIAP audio processing device for a specific TDM slot location on a SONET ring communication backbone. Each ICIAP audio processing device may also be provided with a hardware interface layer that is configured to couple each of the digital audio input channel/s of the ICIAP audio processing device to receive digital audio data from one or more external sources, e.g., such as one or more external analog audio signal sources that are coupled to the hardware interface layer by analog to digital conversion (ADC) circuitry that receives and converts analog audio from the external analog sources to corresponding digital audio data streams that are provided to the hardware interface layer of the ICIAP audio processing device. Each audio input channel of an ICIAP audio processing device may receive audio data from the hardware interface layer, and may be further configured to perform various tasks such as required input channel processing (e.g., decimation, filtering, calculating VOX status, etc.), providing status to a control register interface of the ICIAP audio processing device, and inserting the incoming audio data received from external sources onto slot locations on the SONET ring.

In the above embodiment, each audio output channel of an ICIAP audio processing device may be configured by the control interface layer of the processing device to process incoming audio data of specific slot locations received from the SONET ring. The processed audio data may include a combination of zero, one, or more incoming audio data streams received on SONET ring. The audio output channel accumulates each of the audio streams from the ring, performs the required output channel processing (e.g., interpolation, rules about which samples to sum, scaling for volume adjustments, etc.), provides status to the control register interface and outputs the resulting digital audio data stream to a hardware interface layer that is coupled to one or more external audio receivers via digital to analog conversion (DAC) circuitry. On each audio input channel and audio output channel, multiple authorization checks (e.g., such as checking security tags on audio data, checking channel security, and checking device security) may be performed and enforced to ensure that each audio channel operates at only the level (e.g., classification or caveat) or levels for which it was previously configured.

Further to the above embodiment, control tasks may be relegated to software that is executed by a control processor of a ICIAP connection system that is separate from the ICIAP audio processing device, and which interacts with the audio hardware, input channels, and output channels through a discrete set of ICIAP control registers (i.e., a separate and discrete set of control registers provided for each input and output channel) of a control register interface so as to prevent any access to the secure audio stream data from the software side and hence, preventing any opportunity to compromise data to the software. In one embodiment, the separate hardware channels within an ICIAP audio processing device may be configured (e.g., by hardware description language code and appropriate constraints) so that they do not share memory or any other resources with each other so as to guarantee that inadvertent leakage from one hardware channel to another hardware channel cannot happen. In a further embodiment, this isolation between channels may be combined with a set of deterministic mixing rules that controls how the separate hardware channels are allowed to be combined for output to the hardware audio streams. As a result, this architecture may be implemented in one exemplary embodiment to provide a very high-assurance mechanism that gives simultaneous controlled access to multiple audio streams at multiple levels of security.

In one embodiment, the disclosed systems and methods may be advantageously implemented to incorporate more than two levels of security, for example, to incorporate from 3 levels of security and/or caveats up to 8 levels of security and/or caveats, although the disclosed systems and methods may also be implemented in other embodiments to incorporate less than 3 levels of security and/or caveats, or to incorporate more than 8 levels of security and/or caveats.

In one respect, disclosed herein is a communications system, including at least one audio processing connection system configured to be coupled between a communications backbone and multiple external devices. The audio processing connection system may include: at least one control processing device and at least one separate channelized audio processing device, the control processing device being coupled to the separate audio processing device by a data communication bus; and multiple separate hardware audio processing channels that are each implemented by independent and dedicated hardware paths on the separate audio processing device to separate and isolate each of the audio processing channels from the other audio processing channels, each of the hardware audio processing channels being coupled to the communications backbone by a communications interface layer of the separate audio processing device, and each of the hardware audio processing channels being coupled to one or more of the external devices by a hardware interface layer of the separate audio processing device. The multiple separate hardware audio processing channels may include one or more respective hardware audio input channels, one or more respective hardware audio output channels, or a combination thereof. Each of at least a portion of the hardware audio input channels may be configured to receive audio data from at least one external device coupled to the audio input channel and to insert the received audio data on to the communications backbone via the communications interface. Each of at least a portion of the hardware audio output channels may be configured to extract audio data from the communications backbone via the communication interface and to transmit the extracted audio data to at least one external device coupled to the audio output channel.

In another respect, disclosed herein is a method of communicating data, including: providing at least one channelized audio processing device coupled between a communications backbone and multiple devices external to the audio processing device, the audio processing device including multiple separate hardware audio input and/or output processing channels that are each implemented by independent and dedicated hardware paths on the audio processing device to separate and isolate each of the audio processing channels from the other audio processing channels, each of the hardware audio processing channels being coupled to the communications backbone by a communications interface layer of the audio processing device, and each of the hardware audio processing channels being coupled to one or more of the external devices by a hardware interface layer of the separate audio processing device. The method may also include: providing at least one separate control processing device coupled to the audio processing device by a data communication bus; and performing at least one of the following steps: using at least one of the hardware audio input channels to receive audio data from at least one external device coupled to the audio input channel and to insert the received audio data on to the communications backbone via the communications interface, or using at least one of the hardware audio output channels to extract audio data from the communications backbone via the communication interface and to transmit the extracted audio data to at least one external device coupled to the audio output channel, or a combination thereof.

DESCRIPTION OF ILLUSTRATIVE EMBODIMENTS

Figure 1:
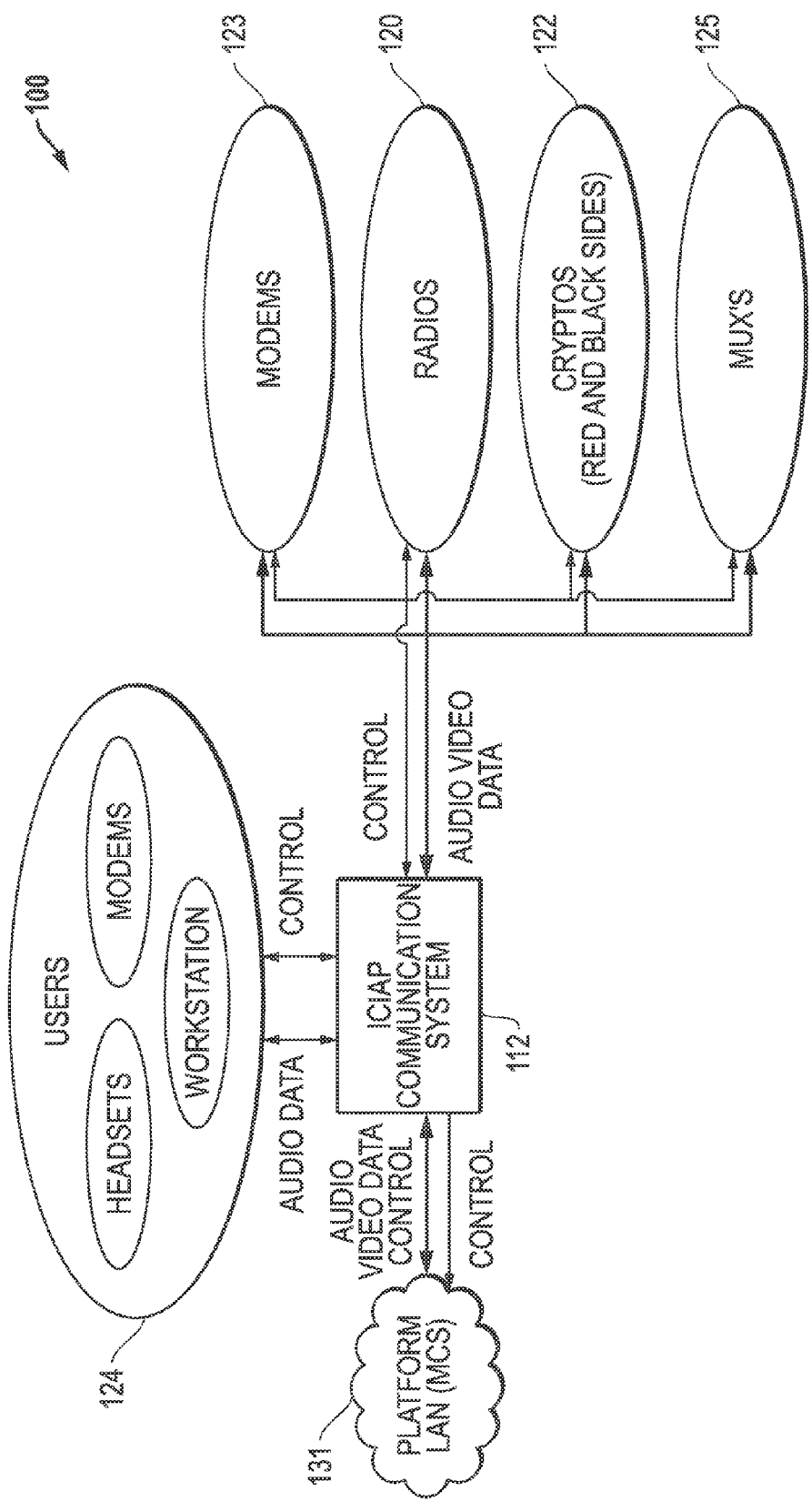
FIG. 1 is a block diagram illustrating a communications network according to one embodiment of the disclosed systems and methods.

FIG. 1 is a block diagram illustrating a communications network 100 according to one embodiment of the disclosed systems and methods. As shown, communications network 100 includes an independent and control-isolated audio processing (ICIAP) communication system 112 that interconnects audio data, associated control signals, and optional video data communications between external devices or systems, such as audio data users 124 (e.g., headsets, speakers, modems, workstations, etc.), non-audio communication devices (e.g., such as modems 123 and multiplexers 125), audio communication devices (e.g., radios 125) and cryptographic devices (CRYPTOS) 122. In one embodiment, ICIAP communication system 112 may also interconnect audio, control and/or video data communications to and from the above-noted devices to an external data network 131 (e.g., local area network "LAN", wireless local area network "WLAN", etc.). In one exemplary embodiment, components of communication network 100 may be implemented to provide independent and control-isolated audio processing for multiple different secure audio streams in order to separate and/or control audio streams at multiple levels of sensitivity and/or security in a multiple operator environment, e.g., on a common mobile platform such as aircraft, UAV, drone, ship, submarine, motor vehicle or spacecraft.

It will be understood that an ICIAP communication system 112 may be implemented in one embodiment to tie together multiple audio sources and destinations on a given platform, and to distribute data and signals as required to meet the utilization needs of a communication network 100. In addition, ICIAP communication system 112 may be implemented to support signaling on a station by station basis as part of a platform LAN 131. ICIAP communication system 112 may be implemented in one exemplary embodiment to enable and provide discrete functions by implementing a communication backbone that combines a star physical configuration with a synchronous TDMA data stream in a logical ring architecture such as described in U.S. Pat. Nos. 7,298,975 and 7,689,123, each of which is incorporated herein by reference in its entirety.

Figure 2A:
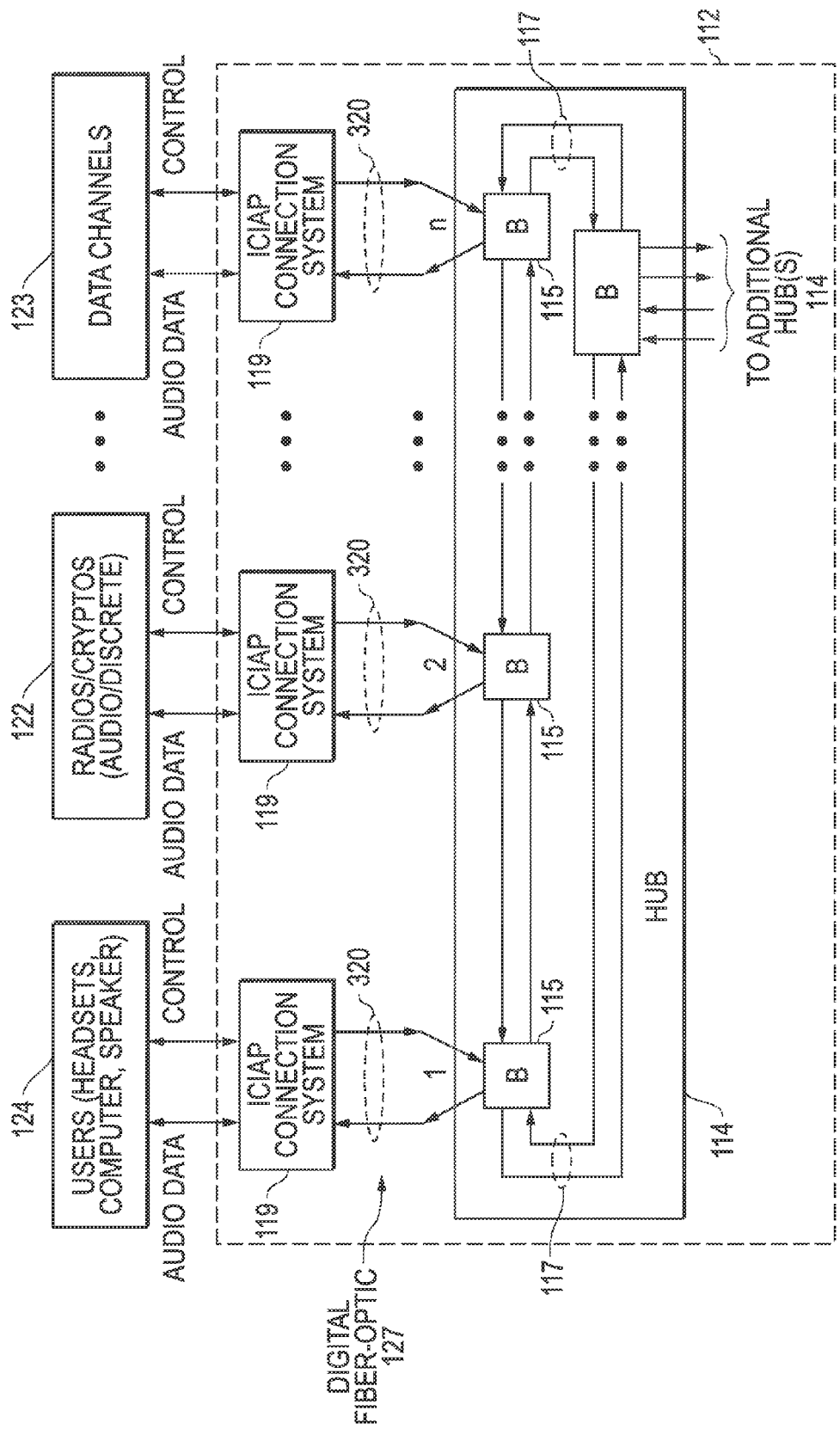
FIG. 2A is a block diagram illustrating an independent and control-isolated audio processing (ICIAP) switching system and coupled external devices according to one embodiment of the disclosed systems and methods.

As illustrated in FIG. 2A, ICIAP communications system 112 may be implemented using a communication backbone configured in the form of a hub 114 for audio data distribution that includes a communication backbone 117 (e.g., such as a dual redundant counter-rotating TDM SONET ring architecture that transfers control messages and audio data so as to distribute the audio data to and from each audio processing device of a given ICIAP connection system 119 and to and from audio processing devices of other ICIAP connection systems 119, as well as well as to optional other hubs 114 of the ICIAP communication switching system 112 as shown. Each of these other hubs 114 may itself be communicatively coupled to one or more other ICIAP connection systems 119 and other devices. As shown, hub 112 includes bypass switches 115 that are present to re-route or bypass audio data and/or control messages intended for a given ICIAP connection system 119 to another ICIAP connection system 119 or hub 112 in the event of detected failure of the given ICIAP connection system 119.

Figure 3:
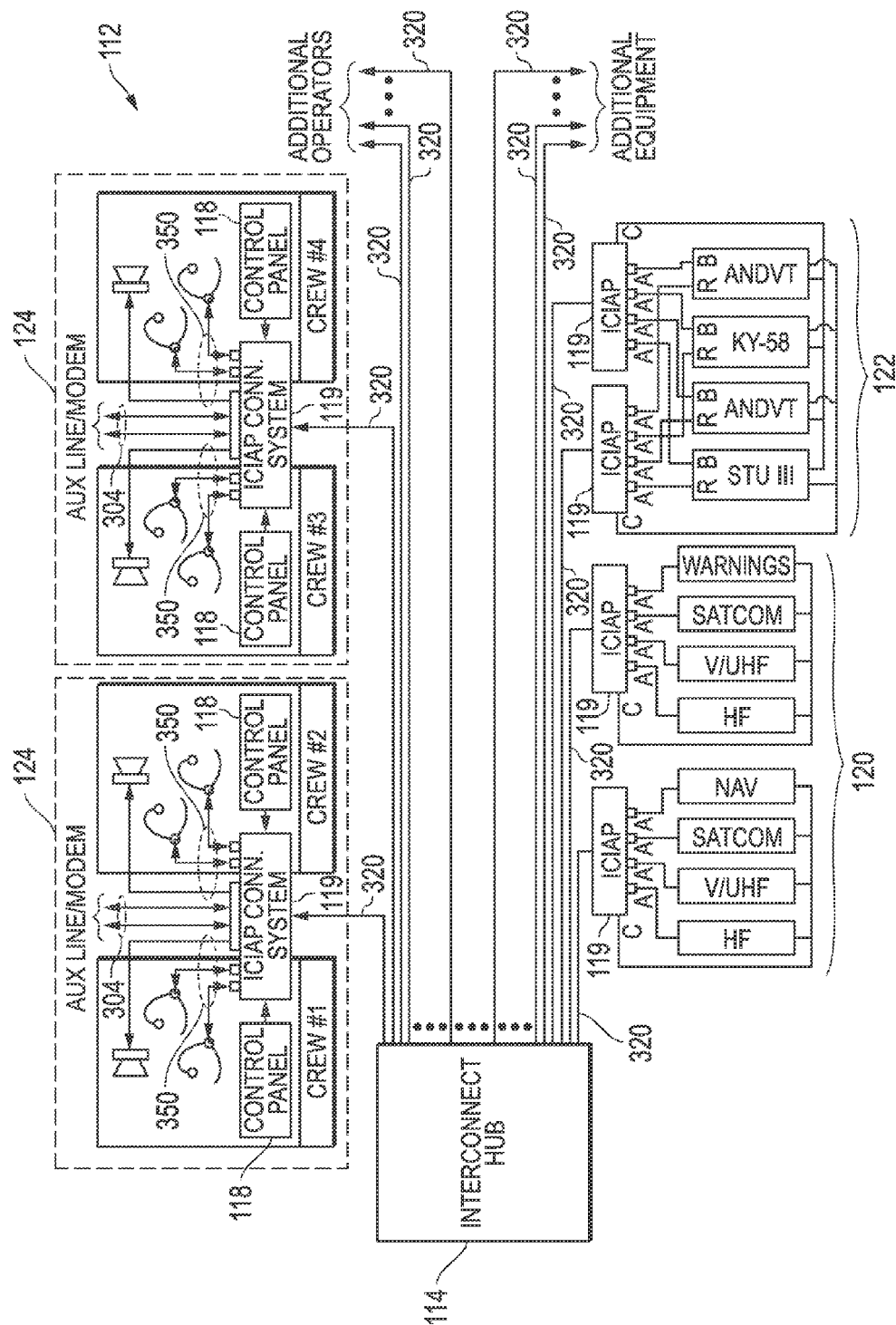
FIG. 3 is a block diagram illustrating an ICIAP switching system and coupled external devices according to one embodiment of the disclosed systems and methods.

Referring now to FIGS. 2A and 3, each of multiple different ICIAP connection systems 119 are coupled to a given interconnect hub 114 by bi-directional ring communication segments 320 (e.g., that are each carrying TDM data information). In such an embodiment, examples of particular types of radio equipment 120 that may be interfaced and controlled by each given ICIAP connection system 119 include, but are not limited to HF, UHF, VHF, SATCOM, Navigational radios, Warning radios, etc. Control signals for such radio equipment may be implemented, for example, by activation of Push-To-Transmit (PTT) lines and assorted mode discretes. Cryptographic devices provide status through discretes. Examples of Cryptographic devices 122 include, but are not limited to, KY-58, ANDVT, KY-75, and STU III devices. As shown, interfaces may be provided to both the Classified and Unclassified sides of each given Cryptographic device 122, and may be used to interconnect any selected Cryptographic device 122 in line with any compatible radio 120. This allows a single Cryptographic device 122 to be dynamically assigned to any radio without the use of external relays or switching boxes. A coupled ICIAP connection system 119 may be provided to handle the discrete interface and handshaking with a connected Cryptographic device 122.

An ICIAP connection system 119 may be interfaced to bi-directionally exchange audio data 350 with a wide variety of audio data user devices 124 including, for example, loudspeakers for public address/broadcast needs and user headsets (e.g., including stereo headsets to provide binaural sound audio streams to provide a stereo output that allows for signals to be azimuth-adjusted). An ICIAP connection system 119 may be additionally configured to handle one or more PTT signals for each of user audio devices 124, e.g., including aircraft control centers that utilize separate PTTs for interphone and radio access to enable an audio stream and an external switch is active. As shown in FIG. 3, an ICIAP connection system 119 may also be configured to exchange audio data 304 and/or control signals with other types of user devices, e.g., such as user modems, control panels 118, workstations, auxiliary lines to other type devices, etc. Further exemplary information on capability and operation of example user devices 124, Radio/Cryptos 122 and data channels 123 in a communications network may be found in U.S. Pat. Nos. 7,298,975 and 7,689,123, each of which is incorporated herein by reference in its entirety. Moreover, it will be understood that the disclosed systems and methods may utilize one or more ICIAP connection systems 119 within an ICIAP communication network 100 to implement the communication capabilities of conventional switching systems that are described in U.S. Pat. Nos. 7,298,975 and 7,689,123, each of which is incorporated herein by reference in its entirety.

Figure 2B:
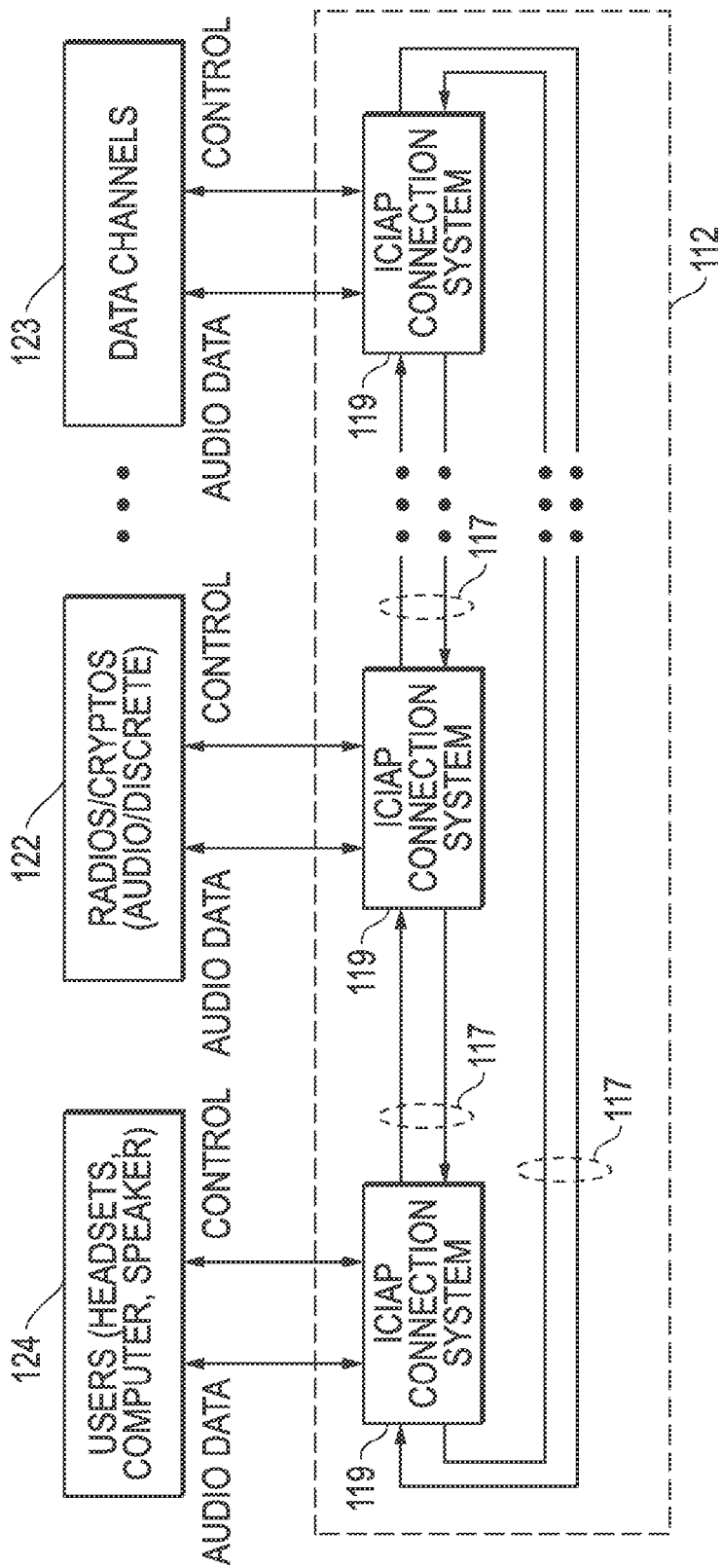
FIG. 2B is a block diagram illustrating an ICIAP switching system and coupled external devices according to one embodiment of the disclosed systems and methods.

It will be understood that illustrated embodiment of FIG. 2A is exemplary only, and that other ICIAP communication system configurations may be implemented in other embodiments. For example, FIG. 2B illustrates an alternative embodiment in which an ICIAP communications system 112 architecture may be implemented without a hub 114 and with functionality of bypass switches 115 implemented instead within ICIAP connection systems 119. However, in this alternative embodiment ICIAP communications system 112 of FIG. 2B is configured to retain the redundant counter-rotating TDM SONET ring architecture 117.

Figure 4:
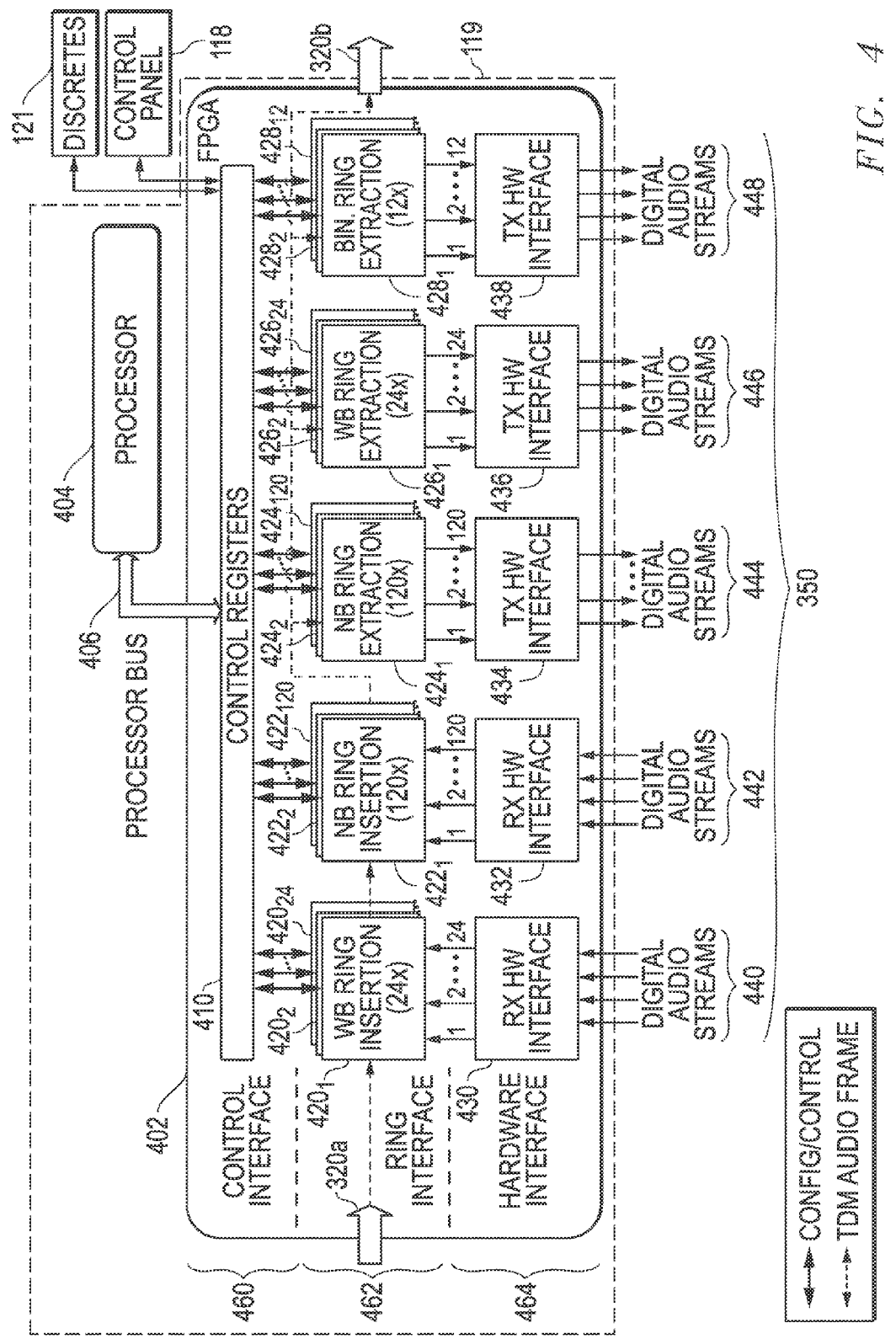
FIG. 4 is a block diagram illustrating an ICIAP connection system and according to one embodiment of the disclosed systems and methods.

FIG. 4 illustrates one exemplary embodiment of an ICIAP connection system 119 that includes an ICIAP audio processing device 402 (e.g., in this case an FPGA processing device) and a separate ICIAP control processing device in the form of control processor 404 (e.g., such as an ARM CPU available from ARM, Ltd. of Cambridge, United Kingdom) that are communicatively coupled together by a data communication bus which in this case is provided in the form of a processor bus 406 (e.g., including any type of link between processor and registers of control register interface). In one exemplary embodiment, ICIAP audio processing device 402 and a separate control processor 404 may be provided together on the same chip substrate. For example, ICIAP audio processing device 402 may be an FPGA fabric that is provided together with a Linux-based dual core ARM CPU control processor 404 as part of a Zynq SOC available from Xilinx of San Jose, Calif. However, it will be understood that an ICIAP audio processing device 402 may be provided in other configurations, including non-SOC architectures or FPGA-only architectures.

In the illustrated embodiment, ICIAP audio processing device 402 is configured to include a processing device control interface layer 460 that includes control register interface 410 (e.g., having control registers in the form of software-settable bits used for configuring specific hardware features), a SONET (e.g., ring) communication interface layer 462 and a processing device hardware interface layer 464. As shown in FIG. 4, processing device hardware interface layer 464 includes multiple wideband input or receiver (RX) hardware interface modules 430 and corresponding multiple wideband output or transmitter (TX) hardware interface modules 436; multiple narrowband input or receiver (RX) hardware interface modules 432 and corresponding multiple narrowband output or transmitter (TX) hardware interface modules 434; and multiple binaural audio output or transmitter (TX) hardware interface modules 438. As with other modules of ICIAP audio processing device 402, each module may in one exemplary embodiment be implemented as separately coded modules on an FPGA, e.g., as an individual VHDL design block of an FPGA.

In one exemplary embodiment, a given narrowband input RX hardware interface module 432 may operate at an 8 kHz sampling rate, while a given wideband input hardware interface module 430 may operate at a 48 kHz sample rate. In one embodiment, wideband audio on a TDM ring may be transmitted 6 samples at a time. However, it will be understood that a narrowband input hardware interface module 432 may be configured in other embodiments to operate at greater or lesser sample rates, and a wideband input hardware interface module 430 may be configured in other embodiments to operate at greater or lesser sample rates.

Processing device ring interface layer 462 of FIG. 4 includes a wideband hub (e.g., ring) data insertion module 420 and a corresponding wideband data extraction module 426, as well as a narrowband data insertion module 422 and a corresponding narrowband data extraction module 424, and a binaural data extraction module 428, it being understood that the number of ring data insertion modules and/or ring data extraction modules provided in a ICIAP connection system 119 may be greater or less in a given embodiment and that the number of ring data insertion modules may be different than the number of ring data extraction modules in a given embodiment.

As shown, each wideband RX hardware interface module 430 and a corresponding respective one of wideband ring data insertion modules 420 are coupled together to form a respective one of 24 separate wideband digital audio stream input channels or nodes 440 transporting 24 separate wideband audio streams, each narrowband RX hardware interface module 432 and a corresponding respective one of narrowband ring data insertion modules 422 are coupled together to form a respective one of 120 narrowband digital audio stream audio input channels or nodes 442 transporting 120 separate narrowband audio streams, each wideband TX hardware interface module 436 and a corresponding respective one of wideband ring data extraction modules 426 are coupled together to form a respective one of 24 wideband digital audio stream audio output channels or nodes 446 transporting 24 separate wideband audio streams, each narrowband TX hardware interface module 434 and a corresponding respective one of narrowband ring data extraction modules 424 are coupled together to form a respective one of 120 narrowband digital audio stream audio output channels or nodes 444 transporting 120 separate narrowband audio streams, and each binaural TX hardware interface module 438 and a corresponding one of respective binaural ring data extraction modules 428 are coupled together to form a respective one of 24 binaural digital audio stream audio output channels or nodes 448 transporting 24 separate wideband audio streams. As illustrated, each of audio input channels/nodes 440 and 442 and each of audio output channels/nodes 444, 446 and 448 may be implemented on an independent section of FPGA hardware separate from every other audio input node 440 and 442 and every other audio output node 444, 446 and 448. In the embodiment of FIG. 4, each of binaural digital audio stream output nodes 448 may include a single input interface from the ring with configurable azimuth setting controlled by control processor 404 through registers of control register interface 410 and two outputs to hardware interface for binaural, stereo audio.

It will be understood that one or more of audio input channels/nodes 440 and 442 and each of audio output channels/nodes 444, 446 and 448 may be coupled to an external device or system, such as one or more of audio data users 124, e.g., hardcoded in FPGA to a particular external device by physical connection/hardware. In this regard, a given channel/node 440, 442, 444, 446 and/or 448 may be coupled to a single such external device or system, although it is also possible that a given channel/node 440, 442, 444, 446 and/or 448 may be coupled to two or more of such external devices or systems. Alternatively, any one or more of audio input channels/nodes 440 and 442 or audio output channels/nodes 444, 446 and 448 may be coupled to another separate ICIAP audio processing device 402, e.g. of the same ICIAP connection system 119. In another alternative, any one or more of audio input channels/nodes 440 and 442 or audio output channels/nodes 444, 446 and 448 may be internally coupled to other circuitry within the same ICIAP audio processing device 402.

In the illustrated embodiment of FIGS. 2-4, the ring architecture of a hub 114 may be used together with processing device ring interface layer 462 to distribute audio inputs received from ring communication segments 320 by audio input nodes 440 and 442 between corresponding local on-chip audio output nodes 444, 446, and 448 of the same ICIAP audio processing device 402 and between audio output nodes of other ICIAP audio processing devices 402 via appropriate ring communication segments 320. In one embodiment, each of audio output nodes or channels 444, 446 and 448 are isolated from each other but have access to all incoming TDM data on ring interface layer 462 via respective extraction modules 424, 426 and 428, and each of audio input nodes or channels 440 and 442 are isolated from each other but have access to all outgoing TDM data on ring interface layer 462 via respective insertion modules 420 and 422.

It will be understood that the input and output architecture of FIG. 4 is exemplary only, and that an ICIAP connection system 119 may be implemented in other embodiments without both wideband and narrowband input and output channels/nodes 440, 442, 444, and 446, and their corresponding hardware interface modules and insertion/extraction modules (e.g., an ICIAP connection system may be configured with any one or more of wideband input, wideband output, narrowband input, narrowband output channel/node capability and associated hardware interface modules and insertion/extraction modules). Moreover, presence of a binaural digital audio stream audio output channel/node 448 and its associated hardware interface module and extraction module is optional. Additionally, in another exemplary embodiment, any one or more of hardware interface modules 430, 432, 434, 436 and/or 438 may be implemented by a separate processing device (e.g., separate FPGA or processor) that is external to the ICIAP processing device 402.

As further shown in FIG. 4, isolated processing device control interface layer 460 of ICIAP audio processing device 402 may be communicate with a control processor 404 across a control register interface 410 of ICIAP processing device 402 via a coupled processor bus 406 (such as AXI4 bus or other suitable processor bus), e.g., with control register interface 410 being implemented with registers for processor bus 406. In one example implementation, one or more control register interfaces 410 for transferring control and status information may be provided as AXI4-Lite register interfaces (AXI4-Lite being lightweight and relatively low-bandwidth version of AXI4 processor bus for control and status information which is based on the ARM, Ltd. Advanced Microcontroller Bus Architecture (AMBA)) with different control register interfaces for control of audio input nodes and audio output nodes. In this embodiment, software or other logic executing on control processor 404 writes insertion and extraction configuration information into respective registers of control register interface 410 for corresponding modules 420, 422, 424, 426 and 428 where data insertion or extraction (as appropriate) is occurring. Using this architecture, control processor 404 is allowed to exchange control information with audio processing device 402 while being completely isolated from audio data of audio processing device 402 so that control processor 404 is prevented from accessing any audio data as it is processed (e.g., inserted, extracted, output and input) by channels 440, 442, 444 and 446 of audio processing device 402.

User control signals may be provided to control processor 404 via control register interface 410 and across bus 406 from external devices such as control panel 118 and discrete control signal sources 121 such as operator push-to-talk or push-to-transmit (PTT) devices. Processing device control interface layer 460 may be implemented in one embodiment to control hardware components (e.g., 430, 432, 434, 436, 438) of one, few or many audio input and/or audio output nodes (e.g., 440, 442, 444, 446, 448) at once. In one exemplary embodiment, processing device control interface layer 460 may be configured to provide the only interface from ICIAP audio processing device 402 to any outside entity for control or status of the audio data insertion and extraction modules 420, 422, 424, 426 and 428 of corresponding respective audio processing nodes 440, 442, 444, 446 and 448. As further shown in FIG. 4, binaural output node 448 may be an extraction channel configured with audio processing that allows audio to be arranged spatially between right and left ears of an operator. In this regard binaural output node 448 may be configured to perform additional audio processing (e.g., such as binning, scaling, delaying, and filtering of audio samples) to provide an azimuth-adjusted stereo output via an operator interface to external devices or systems, such as audio data users 124.

Figure 5:
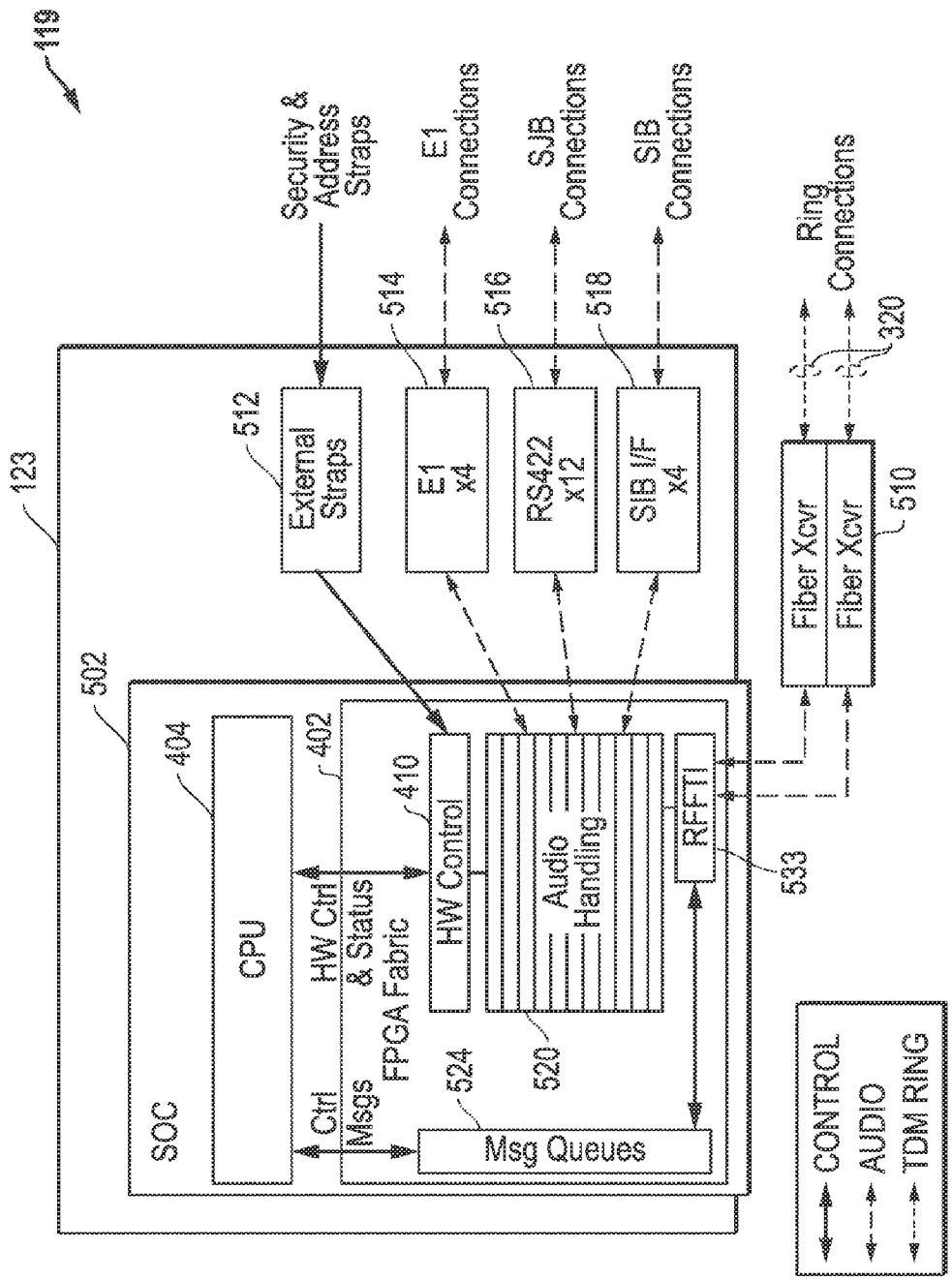
FIG. 5 is a block diagram illustrating an ICIAP connection system and according to one embodiment of the disclosed systems and methods.

FIG. 5 illustrates an ICIAP connection system 119 as it may be implemented in one exemplary embodiment with a SOC 502, e.g., such as a Zynq SOC available from Xilinx of San Jose, Calif. that includes a dual core ARM CPU control processor 404 and an FPGA fabric audio processing device 402. However, it will be understood that other SOC configurations, as well as separate components that are not integrated on a single chip substrate or devices without a dedicated processor may be employed. As shown, FPGA fabric audio processing device 402 may be configured in one exemplary embodiment with audio handling area 520 that contains the multiple audio input nodes or channels 440 and 442 (i.e., including data insertion modules 420, 422 and corresponding RX hardware interface modules 430, 432 coupled as described herein) and audio output nodes or channels 444, 446 and 448 (i.e., including data extraction modules 424, 426, 428 and corresponding TX hardware interface modules 434, 436, 438 coupled as described herein), with each separate channel represented in FIG. 5 as a horizontal line within area 520. As further shown, audio handling area 520 is coupled to fiber transceivers 510 by ring formatting and fiber transceiver interface (RFFTI) 533 that is coupled between fiber transceivers 510 and bi-directional ring communication segments 320 described herein. It will be understood that each of audio input channels or nodes 440 and 442 may be coupled (e.g., across a backplane) to external analog audio sources (e.g., such as user devices 124) by external analog-to-digital converter (ADC), and that each of audio output channels or nodes 444, 446 and 448 may be coupled (e.g., across a backplane) to external analog audio destinations (e.g., such as user devices 124) by external digital-to-analog converter (DAC) circuitry.

As further shown audio input and output channels or nodes of audio handling area 520 may be coupled to exchange audio data with various external devices (e.g., such as audio data users 124, radios/cryptos 122 and data channels 123) via different types of connections such as may be provided, for example, on a printed circuit board (PCB) 123 to which SOC 502 is also mounted or otherwise attached. Examples of possible such connection types include, but are not limited to, E1 digital connections 514 (e.g., for receiving and transmitting narrowband digital audio signals), SIB digital connections 518 (e.g., for receiving and transmitting wideband digital audio signals to CODECs on another system device), SJB (secure jack box)/RS422 digital connections 516 (e.g., for receiving and transmitting custom digital audio signals to another system device). Other examples may include custom digital streams, VoIP, high-speed serial, fiber-optic links, etc. Also illustrated are external straps 512 (i.e., set of pins on an external connector) for physical indication of the authorization of security of the ICIAP device and for physical address identification within the system of the ICIAP device. Such security control signals may be provided at installation of the ICIAP device to specify authorized security levels. In this regard, a set of pins may be provided on an external connector (e.g., an ARCINC 404 box connector) to set the security levels allowed to be processed by the particular ICIAP device. A parity pin may be provided to protect the integrity of the straps, protecting against broken wires, etc. By default, all security levels may be disabled. A separate pin per level (8 total pins in this particular embodiment) may be provided and the pin corresponding to desired security level must be grounded to allow access to that level.

Still referring to FIG. 5, fiber transceivers 510 may be provided to interface ring connection segments 320 with other ICIAP devices 119. As shown, a message queue 524 (e.g., FIFO buffer) may be provided for passing control messages to and from control processor 404 (e.g., from other ICIAP devices and external devices such as control panels, software executing on other processors, generic data interfaces, Ethernet connections, etc.) that are received from backbone ring 117 via ring interface layer 462. Control messages may be carried on the TDM ring 117 and 320 in specific TDM locations, where the messages are segregated from the audio data. Control messages may be used, for example, by the software to send and receive control information about the system. Control messages may be used to change volume settings, change the VOX threshold, change which audio timeslots get summed, change listen or transmit mode, change tone insertion into inputs or outputs, report errors or status of insertion or extraction blocks, etc.

Figure 6:
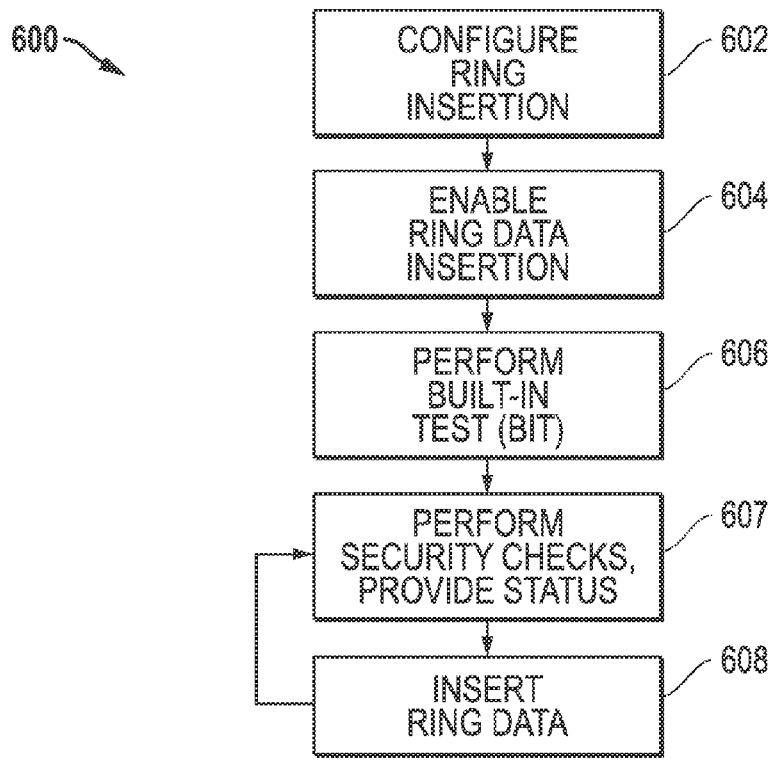
FIG. 6 illustrates audio data insertion methodology according to one embodiment of the disclosed systems and methods.

Returning to FIG. 4, audio data insertion modules 420 and 422 are configured as part of processing device ring interface layer 462 to provide a mechanism for ingesting digital audio samples (e.g., multiple digital audio streams) received from corresponding respective hardware interface modules 430 and 432, and for inserting the received audio data on the ring 117 via communication segment 320b. Each audio data insertion module 420 and 422 performs required audio processing and operates to format the audio data correctly for insertion and transmission on the ring 117. For example, in one exemplary embodiment of ring insertion by audio data insertion modules 420 and 422 of ICIAP connection system 119 may be accomplished in one exemplary embodiment according to the methodology 600 of FIG. 6 as follows.

As shown, ring insertion methodology 600 begins with ring insertion configuration through control interface layer 460 in step 602 to enable processing on a given audio input node. Specifically, control processor 404 of ICIAP connection system 119 may write timeslot (TS) location, security level, security parity, transmit mode and scaling into insertion registers of control register interface 410 of ICIAP audio processing device 402 for each incoming data channel 440 and 442. The binary sum of the security bits and the security parity are written to be even. Next in step 604, ICIAP control processor 404 may enable timeslot insertion by writing a bit that enables ICIAP audio processing device 402 to insert data into configured TS location. A built-in test (BIT) may then be performed in step 606 in which ring data insertion modules 420 and 422 allow control processor 404 to verify channel connectivity. Next in step 607, ICIAP audio processing device 402 may perform security checks, e.g., security checks between channel security settings, box strapping, sample tags and channel security settings. ICIAP audio processing device 402 may further provide status on security checks and/or ring data insertion through control register interface 410 to ICIAP control processor 404 in step 607 as shown.

After preparatory steps 602, 604 and 606 are performed, methodology 600 proceeds to step 608 where ring data insertion is performed continually by ring data insertion modules 420 and 422 of ICIAP audio processing device 402. Exemplary ring insertion tasks that may be performed in this step by ring data insertion modules 420 and 422 include: performing security checks between registers, box strapping and sample tags (zeroing data on failure); performing decimation for changing wideband inputs to narrowband inputs; appending security level onto 13-bit audio samples after any audio processing; inserting timeslot header, audio data and narrowband samples (for wideband audio) into a timeslot specified in the registers; providing cumulative security errors detected (in one embodiment the security counter will reset to zero on a read and the security counter will latch at highest value and will not roll over); and selecting one of several tones for the channel input instead of the channel audio by setting a register.

Still referring to step 608 of methodology 600, for each ring insertion channel ICIAP audio processing device 402 may provide a threshold setting register (e.g., of 7-bits) and an on/off indication to the ICIAP control processor 404 for determination of voice activated (VOX) status. In this example, the threshold value will apply to the top 7 bits of the VOX sum, and VOX may be calculated in a 20 ms fixed window. (e.g., the hot-mic setting indicates that the audio stream is active regardless of the VOX status). ICIAP control processor 404 may write transmit mode setting into ICIAP audio processing device 402 insertion control register interface 410 as they change. ICIAP control processor 404 may then zero inserted data based on VOX and PTT status. In this regard, one example of criteria for active inputs is defined Table 1 below and is based on the PTT/VOX bits written by the processor and the transmit mode setting.

TABLE 1

Transmit Mode Settings

| Transmit Mode | PTT = 0 | | PTT = 1 | |
| --- | --- | --- | --- | --- |
| | VOX = 0 | VOX = 1 | VOX = 0 | VOX = 1 |
| PTT | Inactive | Inactive | Active | Active |
| Hot Mic | Active | Active | Active | Active |
| VOX | Inactive | Active | Inactive | Active |
| General | Inactive | Active | Active | Active |

Still referring to step 608 of ring insertion methodology 600, a security interlock may be performed in which case ICIAP audio processing device 402 may zero inserted data automatically on a channel if the ICIAP control processor 404 has not updated the control registers in a specified time, e.g., such as 64 ms (or 2× the periodic update interval). This allows the insertion module to ensure active control by the processor 404 exists. ICIAP control processor 404 may provide a 16-bit or other value unsigned scaling value. The scaling operation may be implemented in the ICIAP audio processing device 402 such that 0x0FFF is the nominal volume setting allowing for volume to be increased and decreased. Steps 607 and 608 may iteratively repeat during ring insertion by returning to step 607 from step 608 as shown so that performing security checks and providing status happen continuously and in real time.

Figure 7:
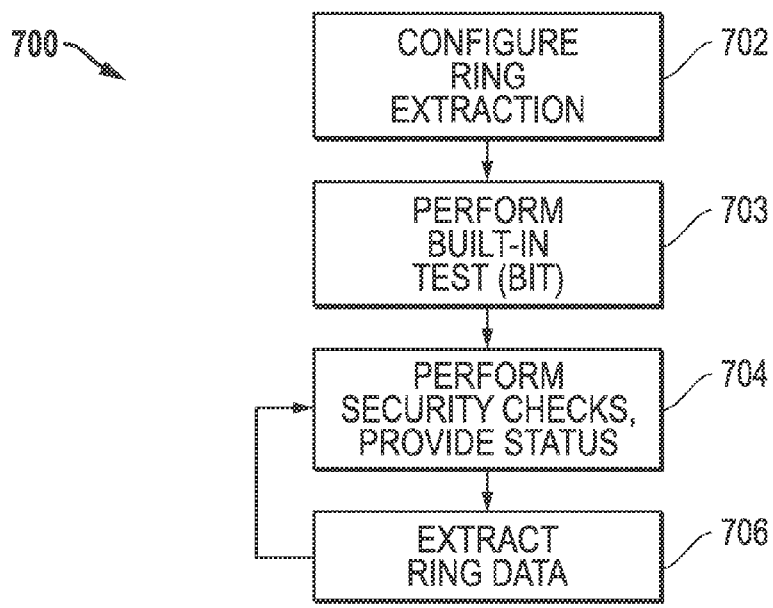
FIG. 7 illustrates audio data extraction methodology according to one embodiment of the disclosed systems and methods.

Audio data extraction modules 424 and 426 are configured to provide a mechanism for extracting and ingesting audio data received from the ring 117 via communication segment 320a and processing that data into output audio samples (e.g., multiple digital audio streams) that are provided to corresponding respective audio hardware interface modules 434 and 436. In this regard, audio data extraction modules 424 and 426 may each be configured to read zero, one or more audio samples from the ring 117, aggregate them and pass them to the respective corresponding audio hardware interface modules 434 and 436. For example, in one exemplary embodiment of ring insertion by audio data extraction modules 424 and 426 of ICIAP connection system 119 may be accomplished in one exemplary embodiment according to the methodology 700 of FIG. 7 as follows.

As shown, ring extraction methodology 700 begins with ring extraction configuration through control interface layer 460 in step 702 to enable processing on a given audio output node. Specifically, in step 702, ICIAP control processor 404 may write security level and security parity, e.g., with the binary sum of the security level bits and security parity being even. In step 702, ICIAP control processor 404 may also write initial summing instructions and initial master scaling values. In one embodiment, summing instructions may be made up of timeslot number, timeslot scaling, timeslot azimuth (for binaural only) and transmit mode. In one embodiment, a summing instruction list may contain up to 64 summing instructions per extraction channel. ICIAP control processor 404 may write initial settings for listen mode into the extraction block configuration. A built-in test (BIT) may be performed in step 703 in which ring data extraction modules 424 and 426 allow control processor 404 to verify channel connectivity. Next in step 704, ICIAP audio processing device 402 may perform security checks, e.g., security checks between channel security settings, box strapping, sample tags and channel security settings. ICIAP audio processing device 402 may also check timeslot security parity and channel security parity. ICIAP audio processing device 402 may zero data on failure of security checks. The security counter may be reset to zero on a read, and the security counter may be configured to latch at highest value and not roll over. ICIAP audio processing device 402 may increment the security counter each time a timeslot is summed when there is a security error. It is further noted that ICIAP control processor 404 may check for security violations in the background as required. ICIAP audio processing device 402 may further provide status on security checks and/or ring data extraction through control register interface 410 to ICIAP control processor 404 in step 704 as shown.

Next, methodology 700 proceeds to step 706 where ring data extraction is performed by each of ring data extraction modules 424 and 426 of ICIAP audio processing device 402. In step 706, ICIAP audio processing device 402 scales and accumulates narrowband and wideband samples received from the ring communication segment input 320a independently of other extraction modules. In this regard, for wideband output, wideband ring data extraction module 426 may interpolate the summed narrowband audio data to change the narrowband signals into wideband signals and then sum the interpolated narrowband data and wideband data together. In either case, each of wideband ring data extraction module 426 and narrowband ring data extraction module 424 scales its corresponding sum and drives the sum to a corresponding TX hardware interface module 436 or 434, respectively. During ring extraction step 706, ICIAP audio processing device 402 may in one embodiment compare the transmit mode of timeslots in the summing list and the PTT/VOX bits of the incoming timeslots against the current "listen mode" setting set by the processor of the output channel and may sum timeslots accordingly. One exemplar embodiment of listen mode behavior is defined in Table 2 below.

TABLE 2

| Listen Mode Settings | | | | |
|---|---|---|---|---|
| | PTT = 0 | | PTT = 1 | |
| Listen Mode | VOX = 0 | VOX = 1 | VOX = 0 | VOX = 1 |
| PTT | Inactive | Inactive | Active | Active |
| Hot Mic | Active | Active | Active | Active |
| VOX | Inactive | Active | Inactive | Active |
| General | Inactive | Active | Active | Active |

During ring extraction step 706, ICIAP control processor 404 may in one embodiment select one of several tones for the channel output (instead of summed audio or summed into the summed audio) by setting a register in control register interface 410. Ring data extraction modules 424 and 426 of ICIAP audio processing device 402 will modify output audio to include the specified tone prior to final scaling of the output sample. To provide a security interlock during ring extraction step 706, ICIAP audio processing device 402 may disable channel output automatically if ICIAP control processor 404 has not updated the summing list in a specified amount of time, e.g., such as 64 ms or other suitable greater or lesser specified time. This allows the extraction module to ensure active control by the processor 404 exists.

Still referring to ring extraction step 706 of methodology 700, the following tasks may be implemented in one embodiment as part of step 706 using a dual port random access memory (DP RAM) configured with a write-only side and a read-only side for each extraction channel to allow reading and writing of shared data by two independent interfaces. ICIAP control processor 404 may update timeslots with entire set of new summing instructions by writing all summing instruction for a given channel followed by a summing instruction with an invalid timeslot location of all ones which indicates to ICIAP audio processing device 402 that the next update to the summing list is complete. At end of frame when the summing list has been updated ICIAP audio processing device 402 may "ping-pong" the DP RAM and start reading from the new list of summing instructions, and may iterate through the most recent list of summing instructions each frame until the list is updated by the ICIAP control processor 404. ICIAP audio processing device 402 may provide a counter to the control processor 404 with the number of timeslots in the summing list for each frame so that the processor 404 may ensure activity of extraction module without observing the audio data. Steps 704 and 706 may iteratively repeat during ring extraction by returning to step 704 from step 706 as shown so that performance of security checks and providing status happen continuously and in real time.

Step 706 may also be optionally implemented in one exemplary embodiment to enable a binaural configuration by designating particular channel pairs which are binaural in configuration by processor 404 or innately in system or design architecture. In one embodiment, those designated channel pairs will be the only binaural channels, and those channels will only be binaural. In one possible binaural processing embodiment, an ICIAP connection system 119 may be configured to use a binaural processing path (e.g., binning, scaling, delaying, and filtering of audio samples), and an ability provided to allow a user/s to select whether binaural processing is desired or not, e.g., by providing control signals to the ICIAP connection system 119. In such an example, the channel pairs may not be arbitrary, but instead may be configured to be selected to either only pair with a specific identified other channel, or to be unpaired. In another possible binaural processing embodiment, an ICIAP connection system 119 may be provided with independent audio processing resources for left and right binaural channels, and controlled with a bit indicating left or right configuration for that channel. In such an embodiment, ICIAP control processor 404 may be responsible for keeping left and right summing lists in sync.

In one exemplary embodiment, a feature referred to as "N-key lockout" may also be implemented by ICIAP control processor 404 in step 706 of methodology 700 to ensure that only specifically allowed audio streams are present on a given audio output. In such an embodiment, ICIAP control processor 404 may be configured to write the specific timeslots which are allowed (i.e., not locked-out) out to the channel's ring data extraction modules 424 and 426. ICIAP audio processing device 402 may be configured to provide PTT and VOX bits for each timeslot on the ring to the ICIAP control processor 404 to notify the ICIAP control processor 404 which inputs are active at any given time. In this regard, PTT and VOX bits may be written by ICIAP control processor 404 as control data on the ring Insertion side of a given ICIAP connection system 119 only for inputs on that ICIAP connection system 119. ICIAP control processor 404 may be configured to determine the state of individual timeslots using the configuration file and the online/offline status provided by the relevant ring data insertion modules 240 and 422. ICIAP audio processing device 402 may report back to ICIAP control processor 404 the number of summed timeslots for each frame for verification of proper ring extraction module operation.

In the illustrated embodiment, control interface layer 460, audio data insertion modules 420 and 422 and audio data extraction modules 424 and 426 are configured to operate to provide specific security checks to ensure that data present on any given audio processing node 440, 442, 444 and 446 is consistent with the security level authorization and importance configured for that specific node. Some of these checks are also described elsewhere herein. For example, ring insertion checks may be performed on the configuration that the control processor 404 writes into the security level of the timeslot with parity into the control registers. No insertion happens if parity is incorrect. Insertion interface (ring data insertion modules 420 and 422) will verify that a security level for a given channel is allowed by an ICIAP connection system 119 security strapping. If level is not allowed by the straps, the error counter will be incremented and channel insertion disabled. Insertion interface may disable insertion of a timeslot if the software has not updated the control registers within a pre-specified time, e.g., 64 ms or other suitable greater or lesser time. Insertion interface will discard or zero any sample received from an interface that does not have a tag that matches the security level of the destination timeslot and will increment the error counter when rejected. In one embodiment, every audio sample is written onto the ring as 16 bits with a 13 bit audio sample and a 3 bit security tag. Insertion interface may inject a timeslot header which includes the security level of the audio with a parity bit. Extraction will discard or zero timeslots with invalid security headers or headers which do not match the sample tags. Insertion interface may increment a security error counter with every error detection. Counter can be read by the software to detect an error. Counter does not roll over and is cleared when read by the software.

In another embodiment, audio input checks may be performed in which software executing on processor 404 may configure the security level of each individual input. Logic executing on ICIAP processing device 402 may be used to verify the level against the security strapping and disable input and log a security violation if not allowed. In one embodiment, logic may convert all samples to 13 bit linear, and fill the 3 least significant bits (LSBs) of the 16 bit sample with the assigned security tag.

In another embodiment, audio summing checks may be performed in which software executing on processor 404 may write the summing list, including the timeslots to be added and their expected security levels and parity, and channel output security level and mask. No summing happens if parity is incorrect or if it is inconsistent with box strapping. Extraction interface (which is made up of ring data extraction modules 424 and 426) may be configured by processor 404 through registers of control register interface 410 to verify the security level for each timeslot to be summed against ICIAP connection system 119 strapping and configured output mask for the channel. The error counter may be incremented and channel summing for that timeslot disabled if an error occurs. Extraction interface (which is made up of ring data extraction modules 424 and 426) may be configured to perform a time slot security check to verify that the timeslot header and all sample tags match the expected security level for each timeslot being summed. The timeslot may be skipped and the error counter incremented if an error is detected. Extraction interface (which is made up of ring data extraction modules 424 and 426) may be configured to disable summing of a channel if the software has not updated the control registers within a specified or pre-specified time (e.g., 64 ms or other suitable greater or lesser time). Summing may tag the resulting summed audio samples with the security level of the output channel. Additionally, logic executing on ICIAP processing device 402 may verify the samples to be written to an output channel are all tagged with the security level of the output channel itself. Any samples not matching may be zeroed before output, and an error logged.

Figure 8:
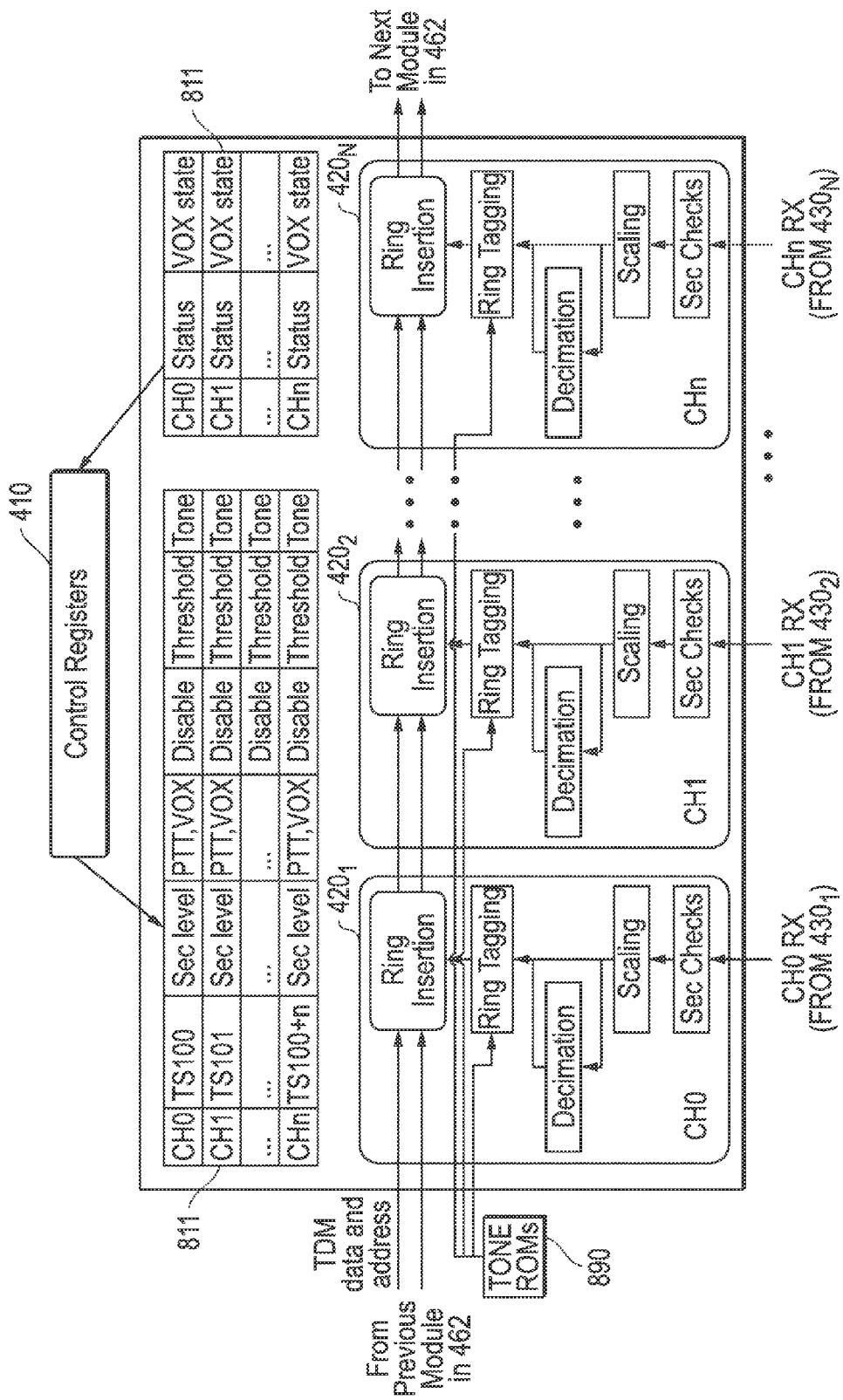
FIG. 8 is a block diagram illustrating ICIAP wideband ring data insertion according to one embodiment of the disclosed systems and methods.

FIGS. 8-11 illustrate exemplary embodiments for configuration of ICIAP connection system 119 for ring data insertion and ring data extraction tasks. Each of FIGS. 8-11 illustrate register information 811 contained in control register interface 410, e.g., in this case each discrete set of registers being contained in a common row having a channel address (CH0, CH1, etc.) that identifies the discrete set of corresponding registers that are contained in the same row for the indicated channel. In particular, FIG. 8 illustrates one exemplary embodiment of wideband ring data insertion using multiple wideband ring data insertion modules $420_1$ to $420_N$ of corresponding multiple wideband audio input channels or nodes 440 that are each coupled to receive input audio data. As shown in FIG. 8, each of data insertion modules $420_1$ to $420_N$ may be configured to perform selective ring tagging in response to control instructions received from registers of control register interface 410. This ring tagging may include reading tone samples from coupled read only memory (ROM) 890 or other suitable storage device, and selectively inserting the retrieved tone samples in place of incoming input data samples from decimation and/or receiver (RX) hardware interface module 430. It will be understood that narrowband ring data insertion may be similarly accomplished using multiple narrowband ring data insertion modules $422_1$ to $422_N$ of corresponding multiple narrowband audio input channels or nodes 442, in which case each of narrowband ring data insertion modules 422 may be implemented with the same internal architecture of wideband ring data insertion modules 420 without decimation logic, i.e., no internal decimation logic may be provided within the narrowband ring data insertion modules 422.

Figure 9:
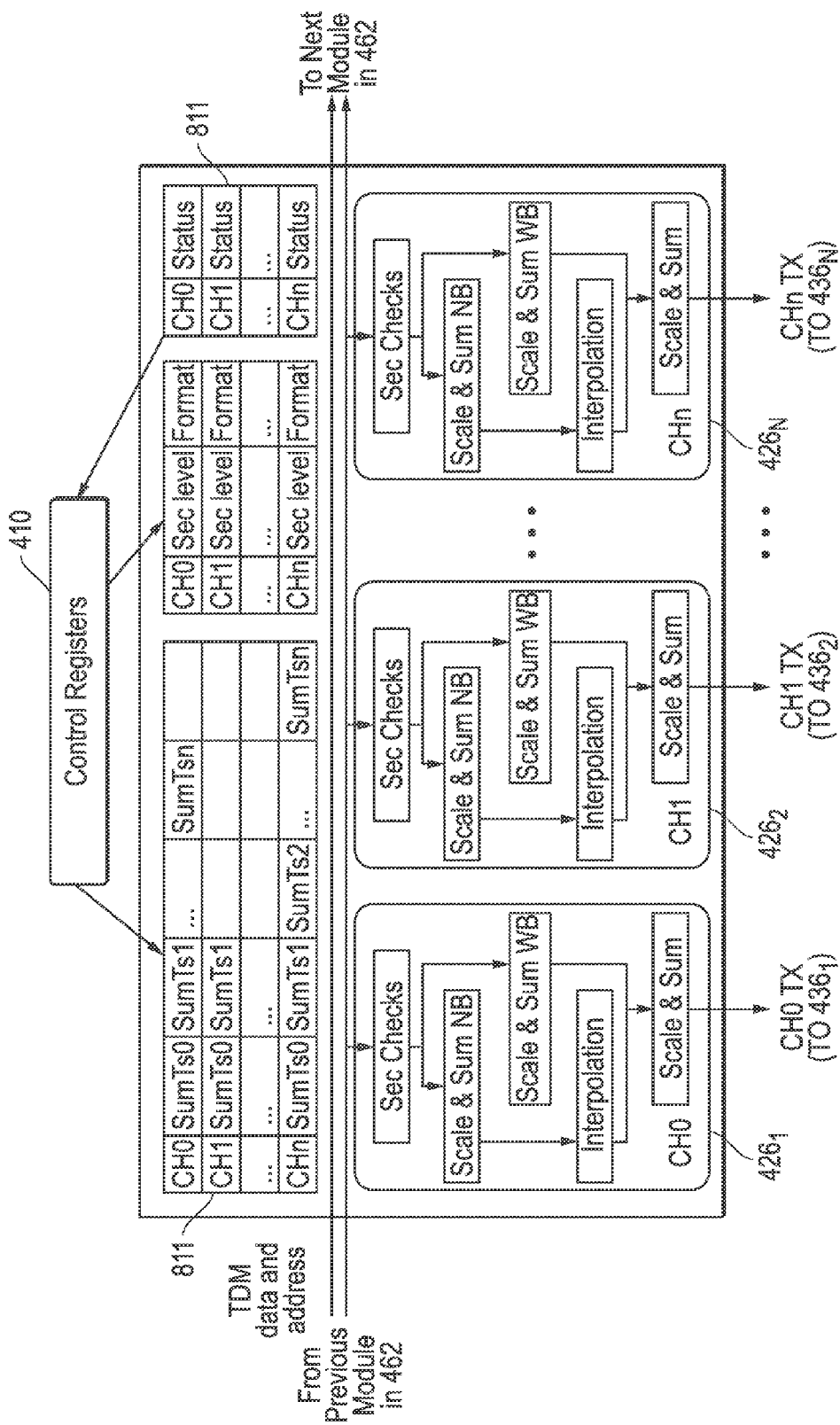
FIG. 9 is a block diagram illustrating ICIAP wideband ring data extraction according to one embodiment of the disclosed systems and methods.
Figure 10:
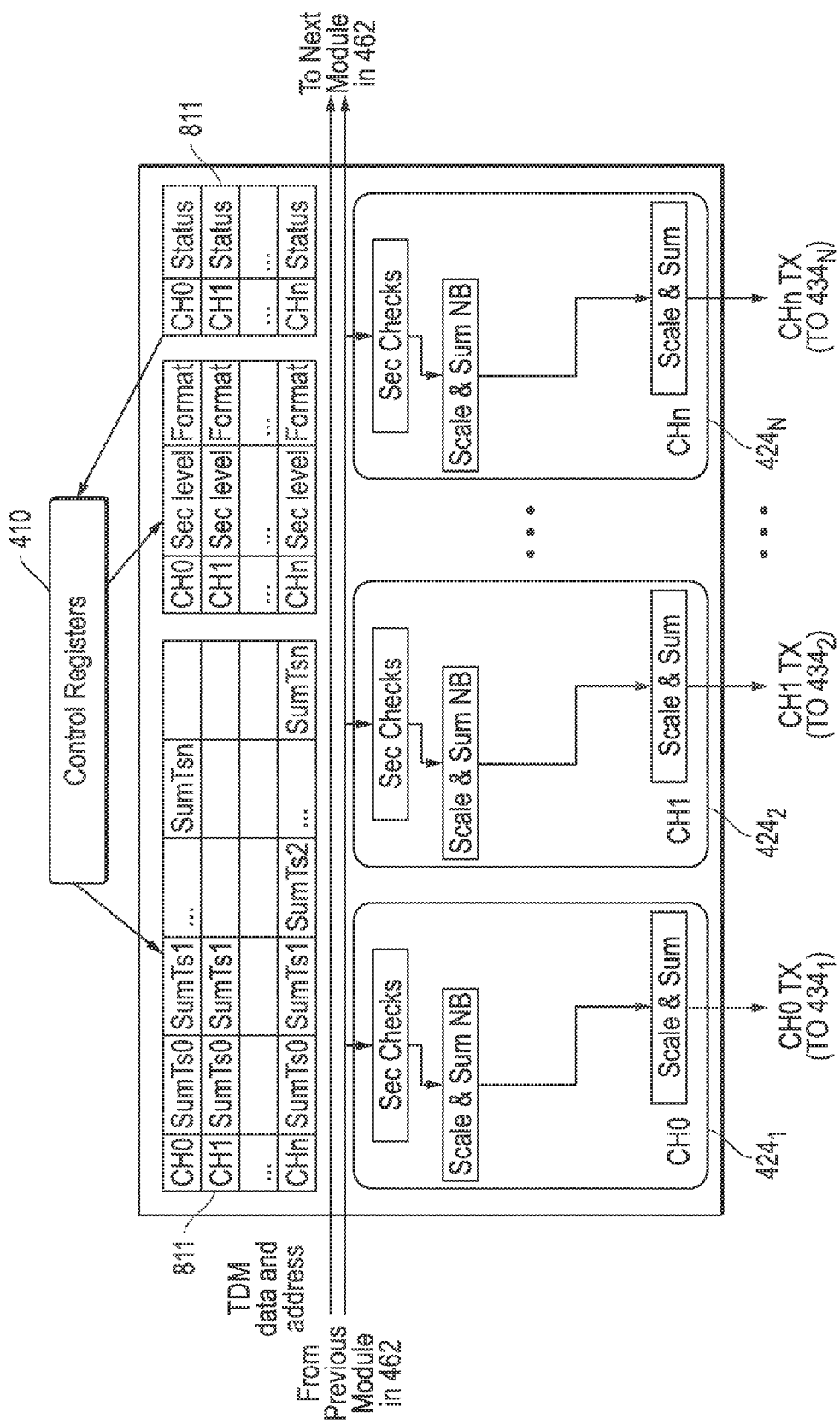
FIG. 10 is a block diagram illustrating ICIAP narrowband ring data extraction according to one embodiment of the disclosed systems and methods.
Figure 11:
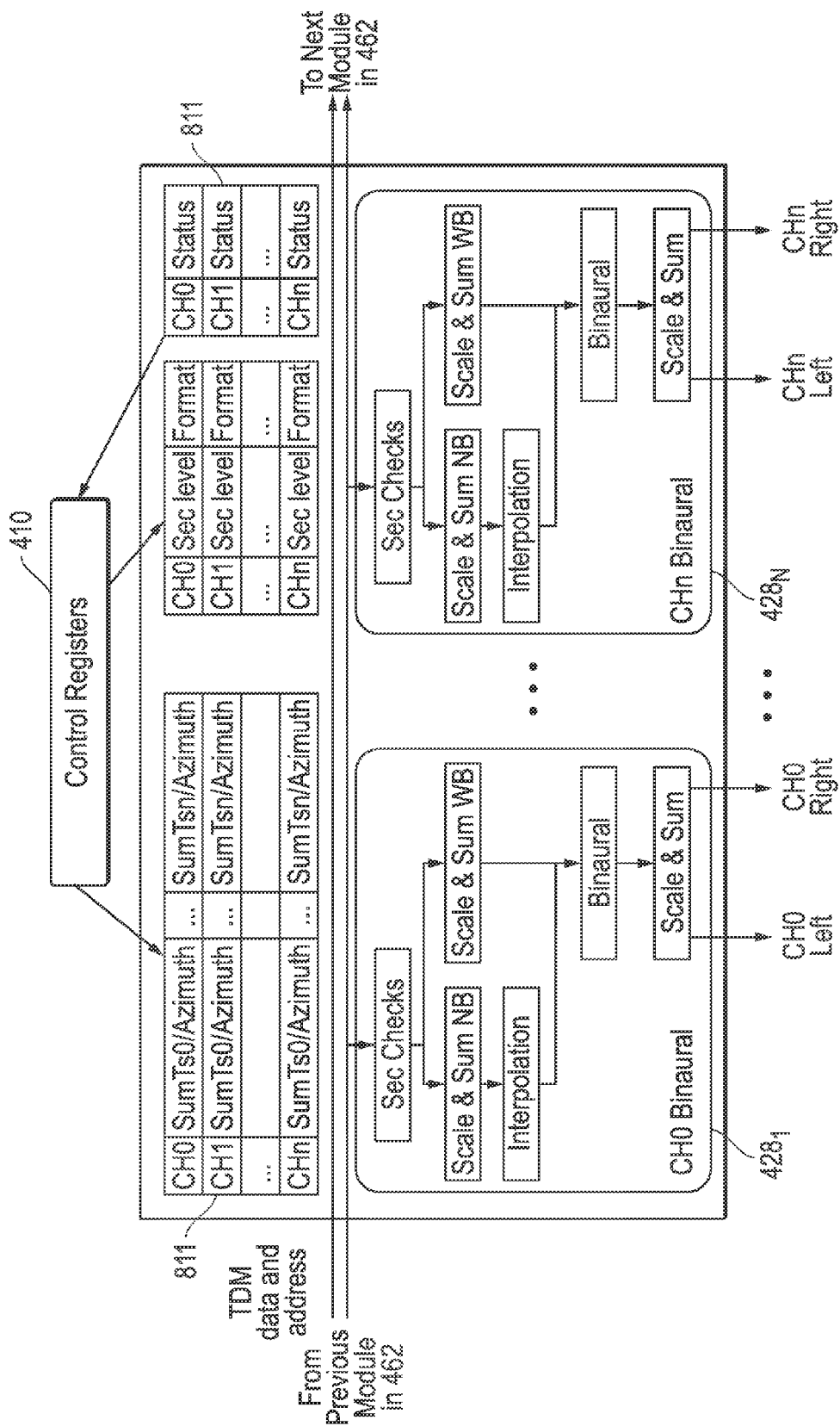
FIG. 11 is a block diagram illustrating ICIAP binaural ring data extraction according to one embodiment of the disclosed systems and methods.

In one embodiment, each of data insertion modules $420_1$ to $420_N$ may be separately coded in audio processing device 402 (e.g., as separately coded modules on an FPGA) so that they are separately encapsulated from each other to provide hardware isolation between the audio data processed by each of data insertion modules $420_1$ to $420_N$. This same hardware isolation may be provided between all individual data insertion and data extraction modules of an audio processing device 402 to provided separate and isolated communication paths for each audio input and audio output channel or node of a given audio processing device 402. In this regard, FIG. 9 illustrates one exemplary embodiment of wideband ring data extraction using multiple wideband ring data extraction modules $426_1$ to $426_N$ of corresponding multiple wideband audio output channels or nodes 446 that are each coupled to provide output audio data. As shown, each wideband ring data extraction module 426 is configured in this embodiment to perform both wideband (WB) and narrowband (NB) processing. FIG. 10 illustrates one exemplary embodiment of narrowband ring data extraction using multiple wideband ring data extraction modules $424_1$ to $424_N$ of corresponding multiple narrowband audio output channels or nodes 444 that are each coupled to provide output audio data. FIG. 11 illustrates one exemplary embodiment of binaural ring data extraction using multiple wideband ring data extraction modules $428_1$ to $428_N$ of corresponding multiple binaural audio output channels or nodes that are each coupled to provide binaural output audio data, e.g., to external user devices 124 or other audio destinations.

In one embodiment, the TDM ring format expects wideband insertion modules (i.e., those modules receiving wideband audio from the hardware layer and inserting it onto the TDM ring) to insert wideband audio samples with a corresponding narrowband audio sample. The narrowband audio sample is produced through the decimation process in the wideband insertion module. This allows narrowband extraction modules (i.e., those modules extracting wideband and/or narrowband audio from the ring and providing it to the hardware layer) to avoid the decimation process since it has already been performed during the insertion step. The narrowband insertion modules (i.e., those modules receiving narrowband audio from the hardware layer and inserting it onto the TDM ring) only insert the narrowband data onto the ring. The wideband extraction modules (i.e., those modules extracting wideband and/or narrowband audio from the ring and providing it to the hardware layer) must transform narrowband data from the ring into wideband data using the interpolation process in the wideband extraction module.

It will be understood that one or more of the tasks, functions, or methodologies described herein (e.g., including those performed by ICIAP processing device 402 and ICIAP control processor 404) may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of such as CPU, controller, microcontroller, processor, microprocessor, FPGA, ASIC, PAL, PLA, CPLD, or other suitable processing device) to perform one or more steps of the methodologies disclosed herein. A computer program of instructions may be stored in or on the non-transitory computer-readable medium residing on or accessible by one or more processing devices for instructing a given system to execute the computer program of instructions. The computer program of instructions may include an ordered listing of executable instructions for implementing logical functions in the device. The executable instructions may comprise a plurality of code segments operable to instruct the system to perform the methodology disclosed herein. It will also be understood that one or more steps of the present methodologies may be employed in one or more code segments of the computer program. For example, a code segment executed by the system may include one or more steps of the disclosed methodologies.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A communications system, comprising at least one independent and control-isolated audio processing connection system configured to be coupled between a communications backbone and multiple external devices, the audio processing connection system comprising:
   at least one control processing device and at least one separate channelized audio processing device, the control processing device being coupled to the separate audio processing device by a data communication bus; and
   multiple separate hardware audio processing channels that are each implemented by independent and dedicated hardware paths on the separate audio processing device to separate and isolate each of the audio processing channels from the other audio processing channels, each of the hardware audio processing channels being coupled to the communications backbone by a communications interface layer of the separate audio processing device, and each of the hardware audio processing channels being coupled to one or more of the external devices by a hardware interface layer of the separate audio processing device;
   where the multiple separate hardware audio processing channels include one or more respective hardware audio input channels, one or more respective hardware audio output channels, or a combination thereof;
   where each of at least a portion of the hardware audio input channels is configured to receive audio data from at least one external device coupled to the audio input channel and to insert the received audio data on to the communications backbone via the communications interface; and
   where each of at least a portion of the hardware audio output channels is configured to extract audio data from the communications backbone via the communication interface and to transmit the extracted audio data to at least one external device coupled to the audio output channel.

2. The communications system of claim 1, where the control processing device is configured to control each of the hardware audio input channels across the data communication bus to insert the received audio data on to the communications backbone; and where the control processing device is configured to control each of the hardware audio output channels across the data communication bus to extract the extracted audio data from the communications backbone.

3. The communications system of claim 2, where the separate audio processing device includes a control register interface provided between the data communication bus and the communications interface, the control register interface being coupled to the data communication bus; and where the control processing device is configured to control each given one of the hardware audio input channels across the data communication bus through a discrete set of control registers of the control register interface that is assigned only to the given hardware audio input channel to cause each given one of the hardware audio input channels to insert the received audio data on to the communications backbone; and where the control processing device is configured to control each given one of the hardware audio output channels across the data communication bus through a discrete set of control registers of the control register interface that is assigned only to the given hardware audio output channel to cause each given one of the hardware audio output channels to extract the extracted audio data from the communications backbone.

4. The communications system of claim 3, where the only communication between the control processing device and the separate audio processing device is through the control registers of the control register interface.

5. The communications system of claim 1, where each of the hardware audio input channels comprises a receiver hardware interface module coupled to a data insertion module, the receiver hardware interface module being configured to receive audio data from at least one external device coupled to the audio input channel and to provide the received audio data to the data insertion module, and the data insertion module being configured to insert the received audio data on to the communications backbone via the communications interface; where each of the hardware audio output channels comprises a transmitter hardware interface module coupled to a data extraction module, the data extraction module configured to extract audio data from the communications backbone via the communication interface and to provide the extracted audio data to the transmitter hardware module, and the transmitter hardware module being configured to transmit the extracted audio data to at least one external device coupled to the audio output channel.

6. The communications system of claim 5, where the communications backbone comprises a Time Division Multiplexing (TDM) communications backbone; where the data insertion module is configured to insert the received audio data onto outgoing TDM slot locations on the communications backbone; and where the data extraction module is configured to extract the extracted audio data from incoming TDM slot locations on the communications backbone.

7. The communications system of claim 1, where the separate channelized audio processing device is configured not to share any processing or memory resources between the separate hardware audio input channels and separate hardware audio output channels.

8. The communications system of claim 1, where the separate channelized audio processing device is a field programmable gate array (FPGA); and where the control processing device comprises a central processing unit (CPU).

9. The communications system of claim 1, where the separate channelized audio processing device is configured to provide status on security checks, ring data insertion and ring data extraction to the control processing device through the control register interface.

10. The communications system of claim 1, further comprising multiple audio processing connection systems coupled together by the communications backbone, a separate audio processing device of each of the multiple audio processing connection systems being coupled to the communications backbone by a respective communications interface and being configured to exchange audio data with the separate audio processing devices of each of the other audio processing connection systems across the communications backbone.

11. The communications system of claim 10, where the communications backbone comprises a Time Division Multiplexing (TDM) Synchronous Optical Network (SONET) backbone ring.

12. The communications system of claim 1, where the separate channelized audio processing device further comprises one or more of the respective hardware audio input channels and one or more of the respective hardware audio output channels; where each of the hardware audio input channels and hardware audio output channels is coupled to the communications backbone by the communications interface of the separate audio processing device; where each of the hardware audio input channels is coupled to at least one external device; and where each of the hardware audio output channels is coupled to at least one external device.

13. The communications system of claim 12, where the components of the communications system are disposed on a multi-operator mobile platform; where the separate channelized audio processing device further comprises multiple respective hardware audio input channels and multiple respective hardware audio output channels; where each of the hardware audio input channels is coupled to a different external device than another one of the hardware audio input channels; where each of the hardware audio output channels is coupled to a different external device than another one of the hardware output channels.

14. A method of communicating data, comprising:
   providing at least one channelized audio processing device coupled between a communications backbone and multiple devices external to the audio processing device, the audio processing device including multiple separate hardware audio input and/or output processing channels that are each implemented by independent and dedicated hardware paths on the audio processing device to separate and isolate each of the audio processing channels from the other audio processing channels, each of the hardware audio processing channels being coupled to the communications backbone by a communications interface layer of the audio processing device, and each of the hardware audio processing channels being coupled to one or more of the external devices by a hardware interface layer of the separate audio processing device;
   providing at least one separate control processing device coupled to the audio processing device by a data communication bus; and
   performing at least one of the following steps:
      using at least one of the hardware audio input channels to receive audio data from at least one external device coupled to the audio input channel and to insert the received audio data on to the communications backbone via the communications interface, or
      using at least one of the hardware audio output channels to extract audio data from the communications backbone via the communication interface and to transmit the extracted audio data to at least one external device coupled to the audio output channel, or
      a combination thereof.

15. The method of claim 14, further comprising using the control processing device to:

control each of the hardware audio input channels across the data communication bus to insert the received audio data on to the communications backbone; and control each of the hardware audio output channels across the data communication bus to extract the extracted audio data from the communications backbone.

16. The method of claim 15, where the separate audio processing device includes a control register interface provided between the data communication bus and the communications interface, the control register interface being coupled to the data communication bus; and where the method further comprises using the control processing device to:

control each given one of the hardware audio input channels across the data communication bus through a discrete set of control registers of the control register interface that is assigned only to the given hardware audio input channel to cause the given hardware audio input channel to insert the received audio data on to the communications backbone; and control each given one of the hardware audio output channels across the data communication bus through a discrete set of control registers of the control register interface that is assigned only to the given hardware audio output channel to cause the given hardware audio output channel to extract the extracted audio data from the communications backbone.

17. The method of claim 16, further comprising only communicating between the control processing device and the separate audio processing device through the control registers of the control register interface.

18. The method of claim 14, where each of the hardware audio input channels comprises a receiver hardware interface module coupled to a data insertion module; where each of the hardware audio output channels comprises a transmitter hardware interface module coupled to a data extraction module; and where the method further comprises:

using the receiver hardware interface module to receive audio data from at least one external device coupled to the audio input channel and to provide the received audio data to the data insertion module;

using the data insertion module to insert the received audio data on to the communications backbone via the communications interface;

using the data extraction module to extract audio data from the communications backbone via the communication interface and to provide the extracted audio data to the transmitter hardware module; and using the transmitter hardware module to transmit the extracted audio data to at least one external device coupled to the audio output channel.

19. The method of claim 18, where the communications backbone comprises a Time Division Multiplexing (TDM) communications backbone; and where the method further comprises:

using the data insertion module to insert the received audio data onto outgoing TDM slot locations on the communications backbone; and using the data extraction module to extract the extracted audio data from incoming TDM slot locations on the communications backbone.

20. The method of claim 14, further comprising operating the separate channelized audio processing device so that no processing or memory resources are shared between the separate hardware audio input channels and separate hardware audio output channels.

21. The method of claim 14, where the separate channelized audio processing device is a field programmable gate array (FPGA); and where the control processing device comprises a central processing unit (CPU).

22. The method of claim 14, further comprising using the separate channelized audio processing device to provide status on security checks, ring data insertion and ring data extraction to the control processing device through the control register interface.

23. The method of claim 14, where the at least one audio processing device is coupled to the separate control processing device by the data communication bus to form an individual audio processing connection system; and where the method further comprises providing multiple audio processing connection systems coupled together by the communications backbone such that a separate audio processing device of each of the multiple audio processing connection systems is coupled to the communications backbone by a respective communications interface and is configured to exchange audio data with the separate audio processing devices of each of the other audio processing connection systems across the communications backbone.

24. The method of claim 23, where the communications backbone comprises a Time Division Multiplexing (TDM) Synchronous Optical Network (SONET) backbone ring.

25. The method of claim 14, where the separate channelized audio processing device further comprises one or more of the respective hardware audio input channels and one or more of the respective hardware audio output channels; where each of the hardware audio input channels and hardware audio output channels is coupled to the communications backbone by the communications interface layer of the separate audio processing device; where each of the hardware audio input channels is coupled to at least one external device; and where each of the hardware audio output channels is coupled to at least one external device.

26. The method of claim 25, where the components of the communications system are disposed on a multi-operator mobile platform; where the separate channelized audio processing device further comprises multiple respective hardware audio input channels and multiple respective hardware audio output channels; where each of the hardware audio input channels is coupled to a different external device than another one of the hardware audio input channels; where each of the hardware audio output channels is coupled to a different external device than another one of the hardware output channels.

* * * * *